US012679449B2

(12) United States Patent
Klotzbach et al.

(10) Patent No.: US 12,679,449 B2
(45) Date of Patent: Jul. 14, 2026

(54) DRIVE CONTROL DEVICE, DRIVE CONTROL METHOD, AND COMPUTER-READABLE STORAGE MEDIUM

(71) Applicant: Nabtesco Corporation, Tokyo (JP)

(72) Inventors: Stephan Klotzbach, Cologne (DE); Masahiro Kishimoto, Cologne (DE)

(73) Assignee: NABTESCO CORPORATION, Tokyo (JP)

( * ) Notice: Subject to any disclaimer, the term of this patent is extended or adjusted under 35 U.S.C. 154(b) by 64 days.

(21) Appl. No.: 18/796,982

(22) Filed: Aug. 7, 2024

(65) Prior Publication Data

US 2025/0083737 A1     Mar. 13, 2025

(30) Foreign Application Priority Data

Sep. 12, 2023    (JP) ................................. 2023-147621

(51) Int. Cl.
*B62D 5/04*          (2006.01)
(52) U.S. Cl.
CPC ........... *B62D 5/049* (2013.01); *B62D 5/0421* (2013.01); *B62D 5/0442* (2013.01); *B62D 5/046* (2013.01)
(58) Field of Classification Search
CPC .... B62D 5/049; B62D 5/0421; B62D 5/0442; B62D 5/046; B62D 5/0493; B62D 5/0484;

(Continued)

(56) References Cited

U.S. PATENT DOCUMENTS 10,797,626 B2 * 10/2020 Murakami ............. H02K 11/26
11,404,992 B2 *  8/2022 Nakamura ........... B62D 5/0484
(Continued)

FOREIGN PATENT DOCUMENTS

JP        2011-195089 A    10/2011
JP        2018-130007 A     8/2018

OTHER PUBLICATIONS

Extended European Search Report dated Feb. 4, 2025, issued in corresponding European Patent Application No. 24193333.2 (10 pgs.).

*Primary Examiner* — Hai H Huynh
(74) *Attorney, Agent, or Firm* — Pillsbury Winthrop Shaw Pittman, LLP

(57)          ABSTRACT
A drive control device includes a plurality of drive instruction systems. Each drive instruction system includes a communication unit, angle detection unit, calculation unit, distribution unit, and drive control unit. The communication unit receives an instruction about a position of a pitman arm from a higher-level device. The angle detection unit detects the angle of the pitman arm. The calculation unit calculates a drive torque for the pitman arm based on the instruction and the angle of the pitman arm. The distribution unit distributes the drive torque according to a predetermined ratio. The drive control unit controls the drive unit. One of the drive instruction systems performs a torque distribution process including a calculation process by the calculation unit and a distribution process by the distribution unit. The drive control unit in each drive instruction system synchronously controls the drive unit with a torque distributed by the torque distribution process.

12 Claims, 14 Drawing Sheets

(58) Field of Classification Search
    CPC .. B62D 5/0403; B62D 5/0487; B62D 5/0463;
                                                    B62D 6/00
    USPC ........................................ 701/41, 42, 43, 44
    See application file for complete search history.

(56) References Cited

U.S. PATENT DOCUMENTS

| 11,505,240 | B2 * | 11/2022 | Kawamura | .......... | B62D 5/0403 |
| 11,560,172 | B2 * | 1/2023 | Sugiyama | .............. | H02P 25/22 |
| 2019/0326843 | A1 | 10/2019 | Kawai et al. | | |

* cited by examiner 700a (300a)

701a

701b 700b (300b)

DRIVE CONTROL DEVICE, DRIVE CONTROL METHOD, AND COMPUTER-READABLE STORAGE MEDIUM

CROSS-REFERENCE TO RELATED APPLICATIONS

This application is based on and claims the benefit of priority from Japanese Patent Application Serial No. 2023-147621 (filed on Sep. 12, 2023), the contents of which are hereby incorporated by reference in their entirety.

TECHNICAL FIELD

The present disclosure relates to a drive control device, a drive control method, and a computer-readable storage medium.

BACKGROUND

Conventionally, electric power steering systems (EPS: Electric Power Steering Systems) using a motor as a drive source are employed in vehicles. For example, to improve the reliability of the steering system, a redundant configuration having a drive motor and two microcontrollers (two systems or lines) is known. In some conventional EPSs, the redundant configuration calculates an assist control amount for a pitman arm independently by each line based on commands related to the position of the pitman arm, and controls the current of the drive motor independently (see, for example, Japanese Patent Publication No. 2011-195089). Some other conventional EPSs perform cooperative control by using multiple signals with different control cycles as control signals in the redundant configuration (see, for example, Japanese Patent Publication No. 2018-130007 ("the '007 Publication")).

In the conventional technology described above, however, there is a risk of inconsistency in the control of a drive motor in the redundant configuration, which prevents accurate position control of the pitman arm. Specifically, for cooperative control of multiple lines, if the currents are controlled independently for synchronization among the multiple lines, inconsistency among the among multiple lines in calculation results for the position control may occur, especially in the case of a bi-wire type EPS. In addition, as described in the '007 Publication, there is a case where the amount of torque outputted from each line is adjusted by using a total drive command for all the lines and a state variable (measured current) of each line as the control signal. Such adjustment is complicated and it is difficult to calculate and control the drive torque for each line depending on the state of the line (e.g., operating mode, heat generation limit, etc.), and it is also difficult to verify the adequate drive torque for each line. In addition, there is a risk of inconsistency due to mutual errors of position sensors.

As for failures, when one line fails or the corresponding line in another system fails, unintended drive torque could be outputted if unintended control is performed in the failed line. Also, if an unintended position command value is received from the failed line, an unintended drive torque will be outputted. Furthermore, if brake torque is generated due to a failure, it will affect the lines functioning normally. In addition, if unintended drive torque is outputted due to a sensor failure, inconsistencies occur among the multiple lines, and it becomes difficult to realize highly accurate position control. Thus, it is difficult for the conventional art to realize highly accurate position control of the pitman arm.

SUMMARY

The present disclosure was made in view of the above, and is to provide a technology that can precisely control the position of the pitman arm A drive control device according to one aspect of the disclosure includes a plurality of drive instruction systems. Each drive instruction system includes: a communication unit receiving an instruction about a position of a pitman arm from a higher-level device; an angle detection unit detecting an angle of the pitman arm; a calculation unit calculating a drive torque for the pitman arm based on the instruction and the angle of the pitman arm; a distribution unit distributing the drive torque according to a predetermined ratio; and a drive control unit controlling a drive unit. One of the plurality of drive instruction systems performs a torque distribution process including a calculation process by the calculation unit and a distribution process by the distribution unit. The drive control unit in each of the plurality of drive instruction systems synchronously controls the drive unit with a torque distributed by the torque distribution process.

With the above configuration, the position control of the pitman arm can be performed with high accuracy using a simple configuration and control.

In the above configuration, each of the plurality of drive instruction systems may further include a configuration unit that sets the drive instruction system to a master mode or a slave mode, the drive instruction system performs the torque distribution process in the master mode, and the drive instruction system does not perform the torque distribution process in the slave mode.

With the above configuration, even when one of the drive instruction systems fails, inconsistency in control of the drive motor between the drive instruction systems can be suppressed and the position control of the pitman arm can be performed with high precision.

In the above configuration, each of the plurality of the drive instruction systems may further include a calculation abnormality detection unit adapted to detect a calculation abnormality indicating that the torque distribution process is unable to be performed, and when the calculation abnormality is detected by the calculation abnormality detection unit, the configuration unit may set own drive instruction system to the slave mode.

With the above configuration, it is possible to suppress inconsistency in control of the drive unit between the plurality of drive instruction systems.

In the above configuration, each of the plurality of drive instruction systems may further include a calculation abnormality obtaining unit that obtains calculation abnormality information, the calculation abnormality information indicates that the calculation abnormality has been detected in at least one of the plurality of drive instruction systems other than the own drive instruction system, when the calculation abnormality information is obtained by the calculation abnormality obtaining unit, the configuration unit may set the own drive instruction system to the master mode.

With the above configuration, even when a calculation abnormality is detected in another drive instruction system, the drive torque is not reduced and thereby it is possible to synchronously control the drive unit.

In the above configuration, each of the plurality of the drive instruction systems may further include a drive control abnormality detection unit that detects a drive control abnormality indicating occurrence of an abnormality in the drive control unit. The slave mode may include a termination mode to terminate operation of own drive instruction system, and when the drive control abnormality is detected by the drive control abnormality detection unit, the configuration unit may set the own drive instruction system to the termination mode.

With the above configuration, it is possible to suppress inconsistency in control of the drive motor between the plurality of drive instruction systems.

In the above configuration, each of the plurality of drive instruction systems may further include: a drive control abnormality obtaining unit that obtains drive control abnormality information, the drive control abnormality information indicates that a drive control abnormality has been detected in at least one of the plurality of drive instruction systems other than the own drive instruction system; and a reduction unit reducing the drive torque calculated by the calculation unit. The master mode may include a reduction mode. When the drive control abnormality information is obtained by the drive control abnormality obtaining unit, the configuration unit may set the own drive instruction system to the reduction mode. In the reduction mode, the reduction unit may prohibit the distribution process by the distribution unit and reduce the drive torque to a third torque. The drive control unit may control the drive unit with the third torque in the reduction mode.

With this configuration, even when one drive instruction system is unable to perform the drive control, it is possible for the other drive instruction system(s) to reduce the drive torque and control the drive unit with the reduced torque.

In the above configuration, each of the plurality of drive instruction systems may further include: a rotation angle detection unit adapted to detect a rotation angle of the drive unit; and an abnormality detection unit adapted to detect, based on the rotation angle detected by the rotation angle detection unit and the angle detected by the angle detection unit, occurrence of at least one of an abnormality in the rotation angle detection unit or an abnormality in the angle detection unit.

This enables accurate detection of sensor abnormalities based on components related to the position control of the pitman arm without the need to add separate components.

In the above configuration, the rotation angle detection unit may be concentric with an output shaft of the drive unit. The drive unit may have a plurality of motor windings, each corresponding to the drive control units of the plurality of drive instruction systems. The plurality of motor windings may be offset from each other by a predetermined angle. Each of the drive control units may control the drive unit by generating a control signal corresponding to the offset of the predetermined angle.

With the above configuration, the relative detection accuracy is improved to reduce the inter-system error of the motor angle, and therefore the position control of the pitman arm can be performed with high accuracy.

In the above configuration, when the abnormality is detected by the abnormality detection unit, the configuration unit may switch the mode before the abnormality is confirmed.

This allows the mode to be switched quickly, thereby reducing the possibility of controlling the drive motor 320 with an inappropriate value.

In the above configuration, the drive unit may include a coil unit. Each of the plurality of drive instruction systems may include a disconnection unit that, when the own drive instruction system is set to the termination mode, stops supplying power to the drive unit and disconnects a wiring connection to which an end of the coil unit is wired.

With the above configuration, the drive motor can be controlled with appropriate torque.

In the above configuration, the communication unit may receive a mode command from the higher-level device according to a mode of the higher-level device. The configuration unit may set a mode indicated by the mode command to own drive instruction system.

With the above configuration, simple coordination control between multiple axles can be achieved.

According to another aspect of the disclosure, provided is a drive control method of a drive control device. The drive control device includes a plurality of drive instruction systems. Each of the plurality of drive instruction systems includes: a communication unit receiving an instruction about a position of a pitman arm from a higher-level device; an angle detection unit detecting an angle of the pitman arm; a calculation unit calculating a drive torque for the pitman arm based on the instruction and the angle of the pitman arm; a distribution unit distributing the drive torque according to a predetermined ratio; and a drive control unit controlling a drive unit. One of the plurality of drive instruction systems performs a torque distribution process including a calculation process by the calculation unit and a distribution process by the distribution unit. The drive control unit in each of the plurality of drive instruction systems synchronously controls the drive unit with a torque distributed by the torque distribution process.

With the above configuration, the position control of the pitman arm can be performed with high accuracy using a simple configuration and control.

According to another aspect of the disclosure, provided is a computer-readable non-transitory storage medium storing a program causing a computer to function as a drive control device. The drive control device includes a plurality of drive instruction systems. Each of the plurality of drive instruction systems includes: a communication unit receiving an instruction about a position of a pitman arm from a higher-level device; an angle detection unit detecting an angle of the pitman arm; a calculation unit calculating a drive torque for the pitman arm based on the instruction and the angle of the pitman arm; a distribution unit distributing the drive torque according to a predetermined ratio; and a drive control unit controlling a drive unit. The program causing one of the plurality of drive instruction systems to perform a torque distribution process including a calculation process by the calculation unit and a distribution process by the distribution unit. The program causing the drive control unit in each of the plurality of drive instruction systems to synchronously control the drive unit with a torque distributed by the torque distribution process.

With the above configuration, the position control of the pitman arm can be performed with high accuracy using a simple configuration and control.

According to the aspects of the present disclosure, the position control of the pitman arm can be performed with high precision.

DESCRIPTION OF THE EMBODIMENTS

The embodiments of the present disclosure will be hereinafter described with reference to the drawings.

EMBODIMENT

<Example of Vehicle 100>

Figure 1:
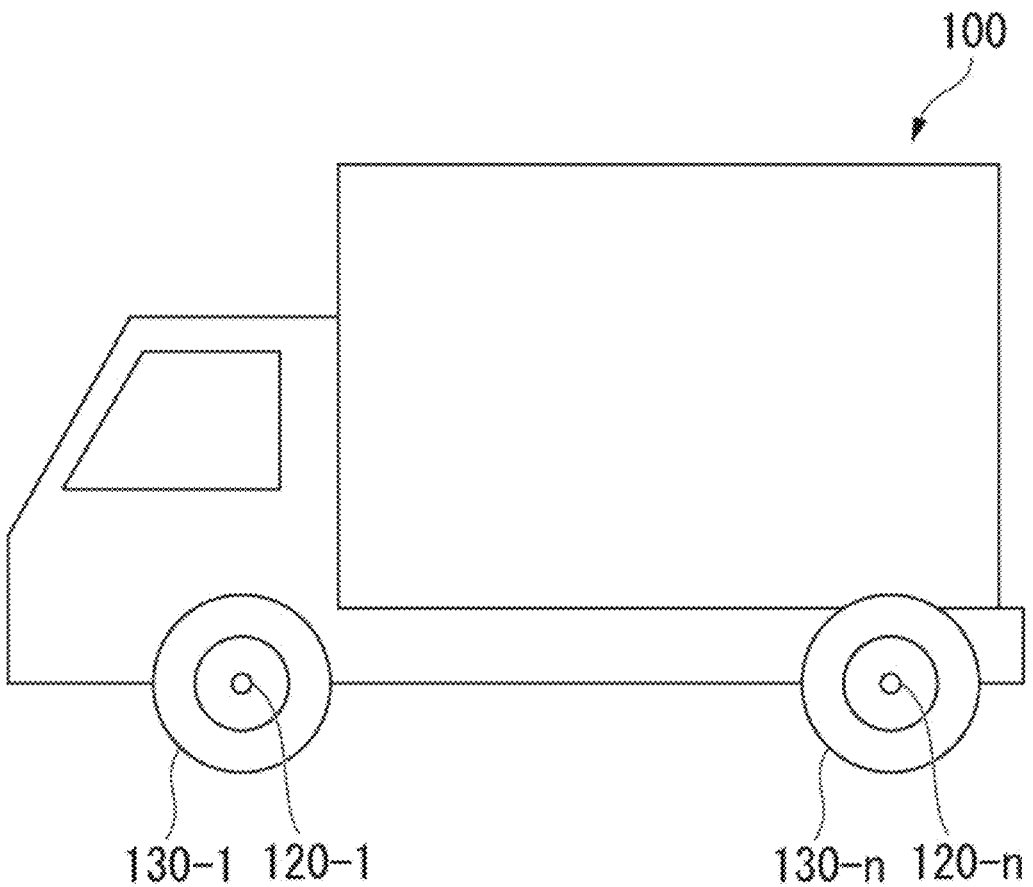
FIG. 1 illustrates an example of a vehicle 100 relating to an embodiment of the present disclosure.

FIG. 1 shows an example of the vehicle 100 related to an embodiment of the present disclosure. The vehicle 100 may be a truck, bus, regular passenger car, or the like. The vehicle 100 includes n (e.g., two) axles 120 (120-1, 120-n) and a number of (e.g., four) tires 130 (130-1, 130-n) corresponding to the number (n) of the axles 120. Specifically, the front wheels of the vehicle 100 include the tires 130a that are connected to the axle 120a. The rear wheels of the vehicle 100 are equipped with tires 130b that are connected to axle 120b. The number (n) of the axles 120 is not limited to "2". In the case of the vehicle 100 such as a trailer or a large bus, the number (n) of axles 120 may be "3 or more".

The axle 120 is equipped with an Electric Power Steering System (EPS). This EPS is a biwire type. The EPS includes a drive motor, a speed reducer, and a pitman arm 330 (see FIG. 3). The drive motor 320 (FIG. 3) generates a drive torque for steering the vehicle. The speed reducer transmits the drive torque from the drive motor 320 to the steering mechanism included in the pitman arm 330. The pitman arm 330 is connected to the speed reducer and is an output arm that is rotated by the drive torque outputted from the speed reducer.

<Example of Configuration Including Steering Wheel of Vehicle 100>

Figure 2:
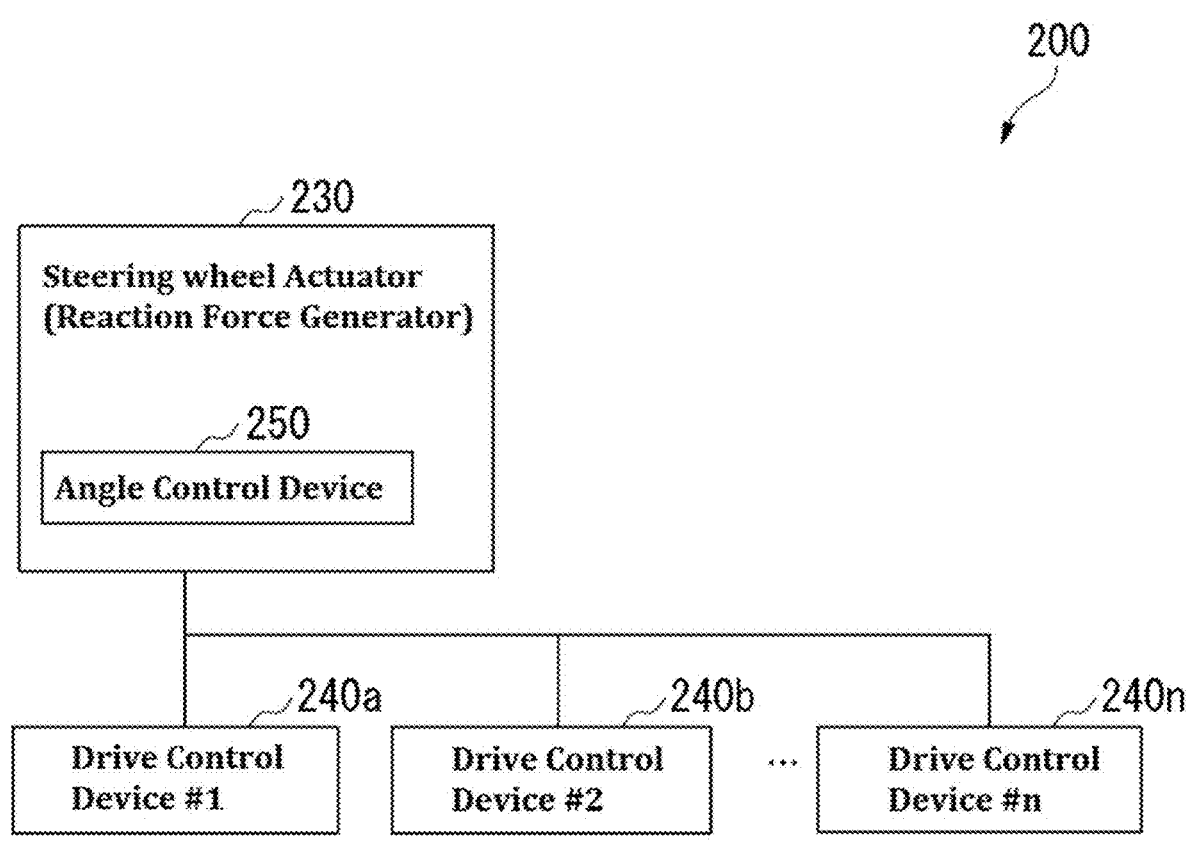
FIG. 2 shows a configuration example of a drive control system 200 for a steering wheel of the vehicle 100.

FIG. 2 shows a configuration example of the drive control system 200 for the steering wheel of the vehicle 100. As shown in FIG. 2, the drive control system 200 includes a steering wheel actuator 230 and a drive control device 240.

The steering wheel actuator 230 (reaction force generator) includes an angle control device 250. The angle control device 250 is a higher-level device provided upstream of the drive control device 240. The angle control device 250 calculates an optimum travel trajectory based on detection results of various sensors, etc., and outputs commands pertaining to the position of the pitman arm 330 (hereinafter referred to as "position commands") to the respective drive control unit 240. The drive control devices 240 (240a to 240n) are provided for the axles 120 (120a to 120n), respectively. The drive control device 240 controls the drive motor 320 with a predetermined torque based on the position command from the angle control device 250.

<Configuration Pertaining to Drive Control of Drive Motor 320>

Figure 3:
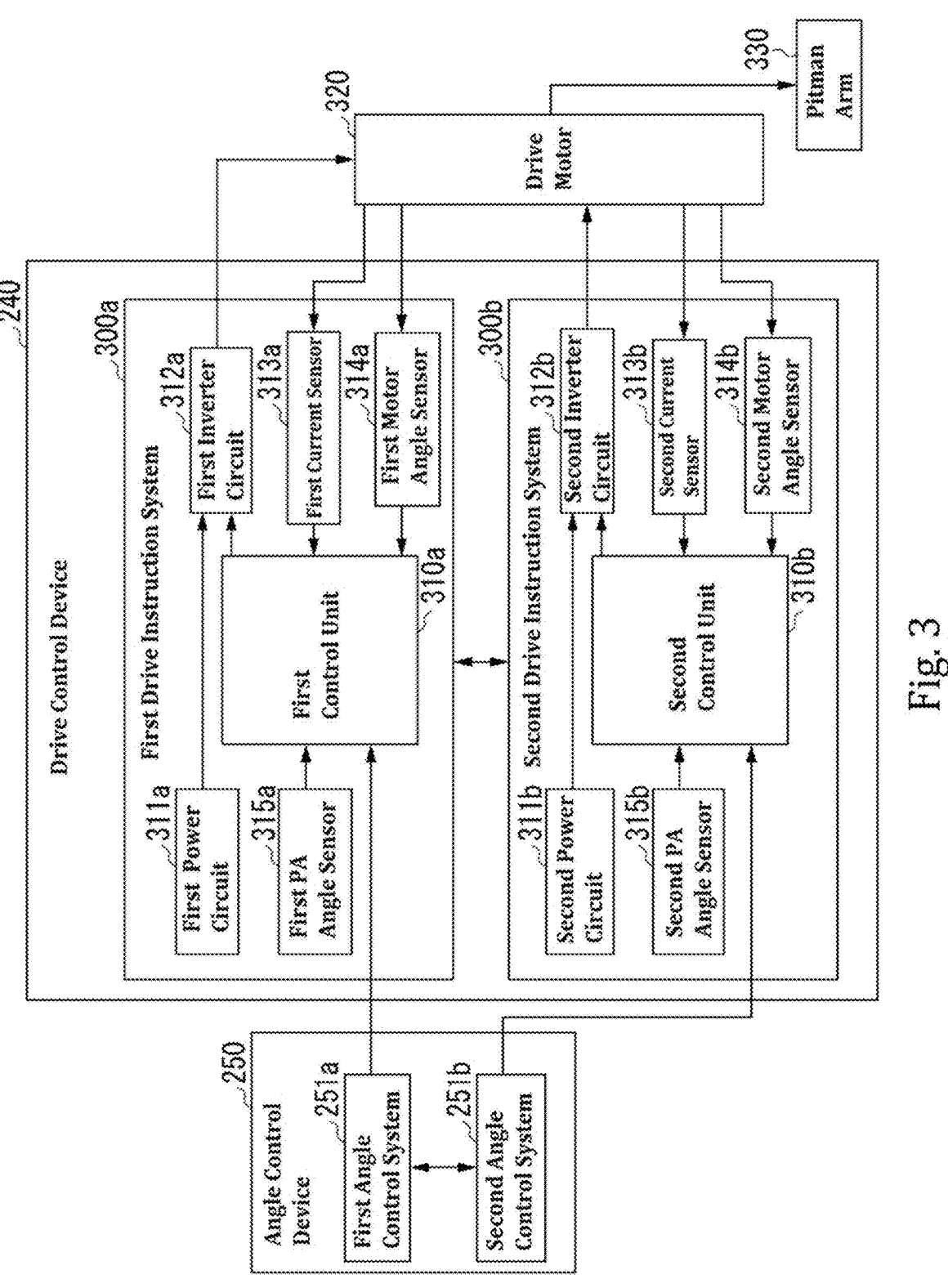
FIG. 3 shows a configuration example of a drive control of a motor.

FIG. 3 shows a configuration example of the drive motor 320. As shown in FIG. 3, the drive control device 240 includes a plurality of drive instruction systems 300 (first drive instruction system 300a and second drive instruction system 300b). The plurality of drive instruction systems 300 are redundant, each having a similar configuration. An ECU (Electronic Control Unit) is used to realize each of the plurality of drive instruction systems 300.

The angle control device 250 includes a plurality of angle control systems 251 (first angle control system 251a and second angle control system 251b). The multiple angle control systems 251 are redundant, each having a similar configuration. The multiple angle control systems 251 are each realized by an ECU.

<Channel 1>

The first angle control system 251a has a channel 1 that is connected to the drive control device 240. The control unit 310 performs overall control of the drive instruction system 300. A first control unit 310a also has a channel 1 that is connected to the channel 1 of the first angle control system 251a. The channel 1 of the first control unit 310a receives position commands for the pitman arm 330 from the channel 1 of the first angle control system 251a.

<Channel 2>

The second angle control system 251b has a channel 2 that is connected to the drive control device 240. A second control unit 310b also has a channel 2 that is connected to the channel 2 of the second angle control system 251b. The channel 2 of the second control unit 310b receives position commands for the pitman arm 330 from the channel 2 of the second angle control system 251b.

<Drive Instruction System 300>

Each of the multiple drive instruction systems 300 has the following configuration and includes following components.

Control unit 310: first control unit 310a, second control unit 310b.

Power circuit 311: first power circuit 311a, second power circuit 311b.

Inverter circuit 312: first inverter circuit 312a, second inverter circuit 312b.

Current sensor 313: first current sensor 313a, second current sensor 313b.

Motor angle sensor 314: first motor angle sensor 314a, second motor angle sensor 314b.

Pitman arm (PA) angle sensor 315: 1st pitman arm angle sensor 315a, 2nd pitman arm angle sensor 315b.

The power circuit 311 generates supply current and sends it to inverter circuit 312. The inverter circuit 312 allows the drive motor 320 to operate at the current value supplied by the power circuit 311. The current sensor 313 detects the current value when the drive motor 320 is operating. The motor angle sensor 314 detects the angle (number of rotations) of the drive motor 320. The motor angle sensor 314 is an example of a rotation angle detection unit. The pitman arm angle sensor 315 detects the angle (position) of the pitman arm 330. The pitman arm angle sensor 315 is an example of an angle detector.

<Drive Motor 320>

The drive motor 320 has a channel 1 and a channel 2. The channel 1 of the drive motor 320 is connected to the components of the first drive instruction system 300a (first inverter circuit 312a, first motor angle sensor 314a, first current sensor 313a). For example, the first inverter circuit 312a supplies current to the drive motor 320 through the channel 1 of the drive motor 320. Similarly, the channel 2 of the drive motor 320 is connected to the components of the second drive instruction system 300b (second inverter circuit 312b, second motor angle sensor 314b, and second current sensor 313b). For example, the second inverter circuit 312b supplies current to the drive motor 320 through the channel 2 of the drive motor 320.

<Configuration of Control Unit 310>

Figure 4:
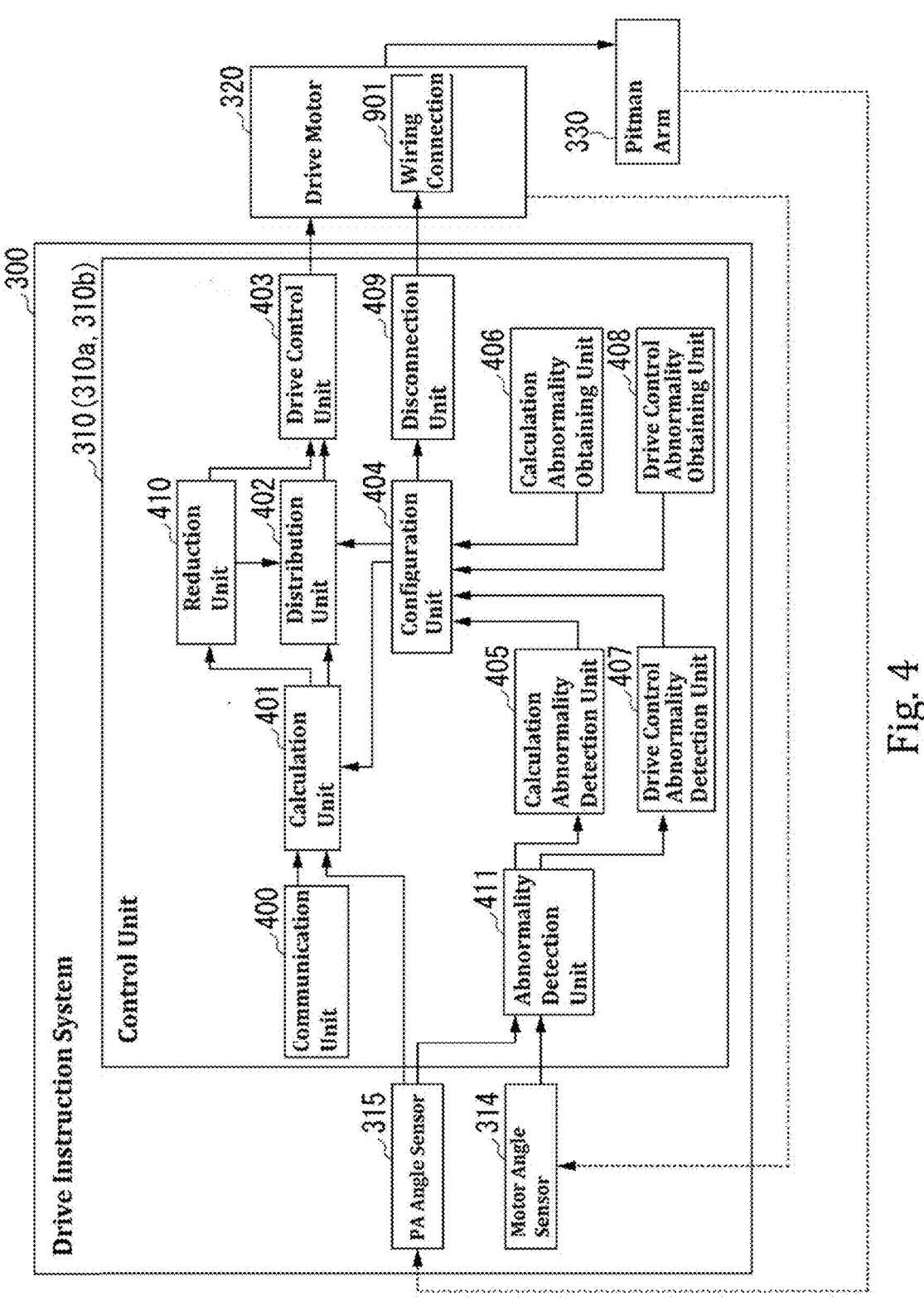
FIG. 4 shows a configuration example of a control unit 310.
Figure 5:
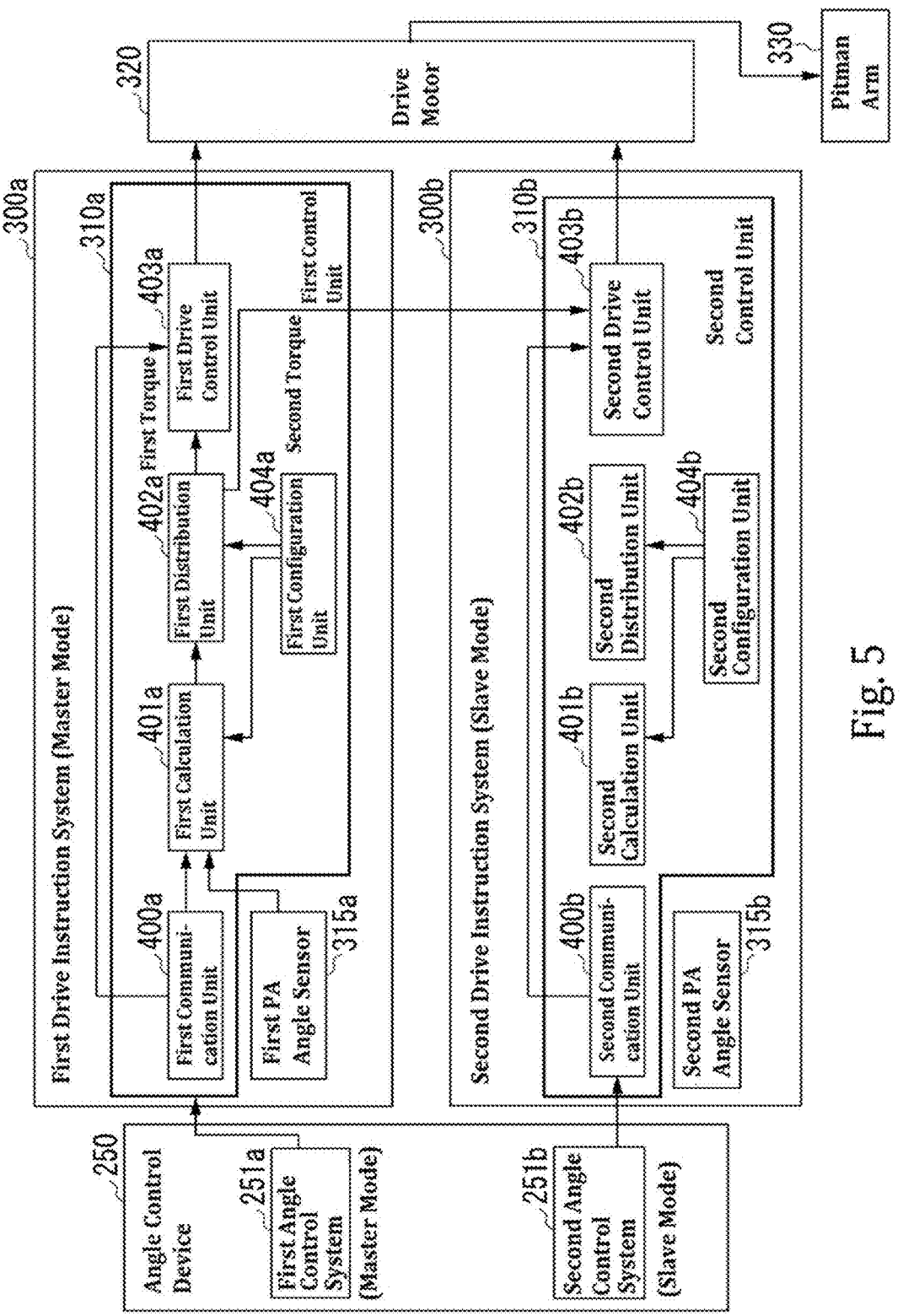
FIG. 5 shows an operation example of the control unit 310.

Next, with reference to FIGS. 4 and 5, a description is given of the control unit 310. FIG. 4 shows a configuration example of the control unit 310. FIG. 5 shows an operation example of the control unit 310. FIG. 5 shows only some of the functional parts shown in FIG. 4.

As shown in FIG. 4, the control unit 310 (first control unit 310a and second control unit 310b, respectively) includes a communication unit 400, a calculation unit 401, an distribution unit 402, a drive control unit 403, a configuration unit 404, a calculation abnormality detection unit 405, a calculation abnormality obtaining unit 406, a drive control error detection unit 407, a drive control error acquisition unit 408, a disconnection unit 409, a reduction unit 410, and an abnormality detection unit 411. The communication unit 400 transmits and receives signals to and from the other functional units 401 to 411 of the control unit 310.

The control unit 310 is implemented by a CPU (Central Processing Unit) in the ECU executing a drive control program stored in a memory such as RAM (Random Access Memory) or ROM (Read Only Memory). The control unit 310 may be implemented by using hardware (including circuitry) such as an LSI (large scale integrated circuit), an ASIC (application specific integrated circuit), an FPGA (field-programmable gate array), and a GPU (graphics processing unit) or may be implemented by the combination of software and hardware. The drive control program may be stored in the memory of the control unit 310 in advance. Alternatively, the drive control program may be stored in memory, such as a removable storage medium, and installed into the memory of control unit 310 when the memory is installed in a drive device. The various information stored in the memory may also be stored on an external server accessible by the control unit 310.

<Reception of Position Instructions>

The communication unit 400 receives position instructions from the angle control system 251 (higher-level device) in the corresponding channel. The communication unit 400 also communicates mutually with the other drive instruction systems 300 that form the redundant configuration.

<Calculation of Drive Torque>

The calculation unit 401 calculates a drive torque for the pitman arm 330. Specifically, the calculation unit 401 obtains a position instruction transmitted from the angle control device 250 via the communication unit 400. The calculation unit 401 also obtains the angle (position) of the pitman arm 330 detected by the pitman arm angle sensor 315. The calculation unit 401 calculates a drive torque based on the obtained position instruction and the angle of the pitman arm 330.

<Distribution of Drive Torque>

The distribution unit 402 divides the drive torque calculated by the calculation unit 401 according to a predetermined ratio into a first torque and a second torque. The predetermined ratio is, for example, 1:1. Here, by way of example, the capacity (maximum torque) of a first drive control unit 403a and the capacity of a second drive control unit 403b are "80" each (total "160"). The drive torque calculated by the calculation unit 401 is here assumed to be "100". In this case, the distribution unit 402 divides "100" of the drive torque into "50/80" of the first torque and "50/80" of the second torque. This ratio can be changed as necessary according to, for example, the physical or functional limitations due to heat generation or the like. In other words, the allocation ratio of the drive torque may be a ratio other than 1:1, or may be changed dynamically depending on constraints or the environment.

<Mode Configuration>

The configuration unit 404 sets each of the drive instruction systems 300 to master mode or slave mode. The drive instruction system 300 set in the master mode performs a series of torque distribution processes. The torque distribution processes include the process of calculating the drive torque by the calculation unit 401 and the process of distributing the drive torque by the distribution unit 402. The drive instruction system 300 in the slave mode does not perform the torque distribution process. The communication unit 400 of the drive instruction system 300 in the slave mode receives the second torque distributed by the distribution unit 402 of the drive instruction system 300 that is in the master mode from the communication unit 400 in the master mode.

The following description assumes that the first drive instruction system 300a is set in the master mode and the second drive instruction system 300b is set in the slave mode.

As shown in FIG. 5, the first drive instruction system 300a, which is in the master mode, performs the torque distribution process. Specifically, the first calculation unit 401a calculates the drive torque (e.g., "100") based on the position instruction received by the first communication unit 400a and the angle of the pitman arm 330 detected by the first pitman arm angle sensor 315a. The first distribution unit 402a divides "100" of the drive torque calculated by the first calculation unit 401a into "50" of the first torque and "50" of the second torque according to the ratio, 1:1. The first distribution unit 402a outputs a first assist command indicating the first torque to the first drive control unit 403a, and further outputs a second assist command indicating the second torque to the second drive control unit 403b in the second drive instruction system 300b via the first communication unit 400a.

The drive control unit 403 performs a drive control process to control the drive of the drive motor 320. The drive control process includes, for example, converting the torque commanded by the assist command into a current command value, performing current control, and outputting a motor drive signal. The first drive control unit 403a in the first drive instruction system 300a drives and controls the drive motor 320 with the first torque indicated by the first assist command. The second drive control unit 403b in the second drive instruction system 300b drives and controls the drive motor 320 at the second torque indicated by the second assist command.

The first drive control unit 403a and the second drive control unit 403b drive and control the drive motor 320 at the timing when they received the assist command from the first distribution unit 402a. Thus, the first drive control unit 403a and the second drive control unit 403b can drive and control the drive motor 320 synchronously. This allows the drive motor 320 to be drive-controlled without inconsistencies between the multiple drive instruction systems 300, thus enabling highly accurate position control of the pitman arm 330.

<Mode Change>

In this embodiment, the drive control device 240 can be applied to a system in which the master mode and the slave mode are unified for all the instruction systems. Among the plurality of the drive instruction systems 300 installed in the drive control devices 240 provided for "n" (e.g., two) axles 120, when the mode is changed (switched) in the multiple drive instruction systems 300 installed in the drive control device 240 for one of the axles 120, the drive instruction systems 300 installed for the other of the axles 120 are also controlled to change their mode.

<Fail-Safe Operation: Mode of Continues 100% Output>

Hereunder described will be switching of the master mode when an abnormality that prevents torque distribution process (calculation abnormality) occurs in the drive instruction system 300 in the master mode. The master mode switching described below may be referred to as "fail-safe operation configuration".

The calculation abnormality detection unit 405 detects calculation abnormalities indicating that the torque distribution process cannot be performed. The calculation abnormality is, for example, an abnormality (failure) of the pitman arm angle sensor 315 or an abnormality (failure) that prevents the communication unit 400 from receiving the position commands from the angle control system 251. An example of detecting an abnormality of the pitman arm angle sensor 315 will be later described.

The calculation abnormality detection unit 405 detects a calculation abnormality when, for example, the drive instruction system to which calculation abnormality detection unit 405 belongs is set in the master mode. The calculation abnormality is a state that is inappropriate for drive torque calculation control, but is normal for the drive control by the drive control unit 403. Thus, when the calculation abnormality is detected by the calculation abnormality detection unit 405, the master mode and slave mode are switched between the multiple drive instruction systems 300 provided in the drive control unit 240.

<First Drive Instruction System 300a→Slave Mode>

The first configuration unit 404a sets the first drive instruction system 300a to the slave mode when a calculation abnormality is detected by the calculation abnormality detection unit 405.

<Second Drive Instruction System 300b→Master Mode>

When the calculation abnormality detection unit 405 in the first drive instruction system 300a detects a calculation abnormality, it outputs calculation abnormality information indicating that the calculation abnormality has been detected to the second drive instruction system 300b via the first communication unit 400a.

The calculation abnormality obtaining unit 406b in the second drive instruction system 300b obtains the calculation abnormality information transmitted from the first communication unit 400a in the first drive instruction system 300a via the second communication unit 400b. The calculation abnormality information obtained by the calculation abnormality obtaining unit 406b indicates that a calculation abnormality has been detected in the other drive instruction system(s) (first drive instruction system 300a) than the own instruction system (second drive instruction system 300b).

The second configuration unit 404b sets the second drive instruction system 300b to the master mode when the calculation abnormality information is obtained by the calculation abnormality obtaining unit 406b.

Thus, the fail-safe operation configuration switches the first drive instruction system 300a to the slave mode and the second drive instruction system 300b in the slave mode to the master mode when a calculation abnormality is detected in the first drive instruction system 300a in the master mode. According to the fail-safe operation configuration, the drive motor 320 can be driven and controlled with the same drive torque as before the occurrence of the calculation abnormality. Specifically, even in a situation in which the position control may not be possible due to insufficient drive torque (e.g., stationary steering while the vehicle stops), the position control can be continuously performed with high precision.

<Fail Operation Configuration: 50% Reduction Mode>

Switching of the master mode when an abnormality that prevents the drive control (drive control abnormality) in the drive instruction system 300 in the master mode will now be described. The master mode switching described below may be referred to as "fail operation configuration".

The drive control abnormality detection unit 407 detects drive control abnormalities that indicate abnormalities in the drive control unit 403. The drive control abnormalities are, for example, abnormalities in the power circuit 311, inverter circuit 312, current sensor 313, and motor angle sensor 314. An example of detecting an abnormality in the motor angle sensor 314 will be described later.

The drive control abnormality detection unit 407 can detect drive control abnormalities regardless of whether the system is in the master mode or slave mode. The control in the slave mode includes the process of setting the corresponding drive instruction system to a termination mode which terminates the operation of the corresponding drive instruction system. The master mode control includes the process of setting the corresponding drive instruction system to a reduction mode, which reduces the drive torque. The configuration unit 404 sets the drive instruction system to which the configuration unit 404 belongs to the termination mode when a drive control abnormality is detected by the drive control abnormality detection unit 407.

For example, when a drive control abnormality is detected in the first drive instruction system 300a, the first configuration unit 404a sets the first drive instruction system 300a to the termination mode.

<First Drive Instruction System 300a→Termination Mode>

For example, a case in which a drive control abnormality is detected in the first drive instruction system 300a will now be described. In this case, once the first drive instruction system 300a detects a drive control abnormality, it outputs drive control abnormality information indicating that the drive control abnormality has been detected to the second drive instruction system 300b via the first communication unit 400a.

<Second Drive Instruction System 300b→Reduction Mode>

The drive control abnormality obtaining unit 408b of the second drive instruction system 300b obtains the drive control abnormality information from the first drive instruction system 300a. The drive control abnormality information obtained by the drive control abnormality obtaining unit 408b indicates that a drive abnormality has been detected in the other drive instruction system(s) (first drive instruction system 300a) except the drive instruction system (second drive instruction system 300b) to which the obtaining unit 408*b* belongs. When the drive control abnormality information is obtained by the drive control abnormality obtaining unit 408*b*, the second configuration unit 404*b* sets the second drive instruction system 300*b* to the reduction mode.

In the reduction mode, the second calculation unit 401*b* in the second drive instruction system 300*b* calculates the drive torque. Furthermore, the reduction unit 410*b* in the second drive instruction system 300*b* prohibits the distribution process by the second distribution unit 402*b* and reduces the drive torque to a third torque. For example, the reduction unit 410*b* reduces the drive torque to the third torque representing 50% of its value. To reduce the third torque to 50% means, for example, that if the drive torque calculated by the calculation unit 401*b* is "100", the third torque will be "50".

The reduction process by the reduction unit 410*b* is not limited to reducing the drive torque "100" to the third torque "50". For example, the capacity (maximum torque) of the first drive control unit 403*a* and the second drive control unit 403*b* may be "80". Thus, the reduction unit 410*b* can reduce "100" of the drive torque to a third torque that represents a value within a range not exceeding "80" according to the maximum torque setting. When the drive torque is reduced to the third torque by the reduction unit 410*b*, the second drive control unit 403*b* controls the drive motor 320 at the reduced third torque.

Thus, in the fail operation configuration, when a drive control abnormality is detected in one of the drive instruction systems 300, this drive instruction system 300 is switched to the termination mode and the other of the drive instruction systems 300 is switched to the master mode (reduction mode). According to the fail operation configuration, even if the drive control becomes impossible in one of the drive instruction systems 300, the other drive instruction system(s) 300 can perform the drive control of the drive motor 320 by reducing the drive torque.

If drive control abnormalities are detected in both the first and second drive instruction systems 300*a*, 300*b*, both will be switched to the termination mode and the position control of the pitman arm 330 will not be performed anymore.

<Motor Windings>

Figure 6A:
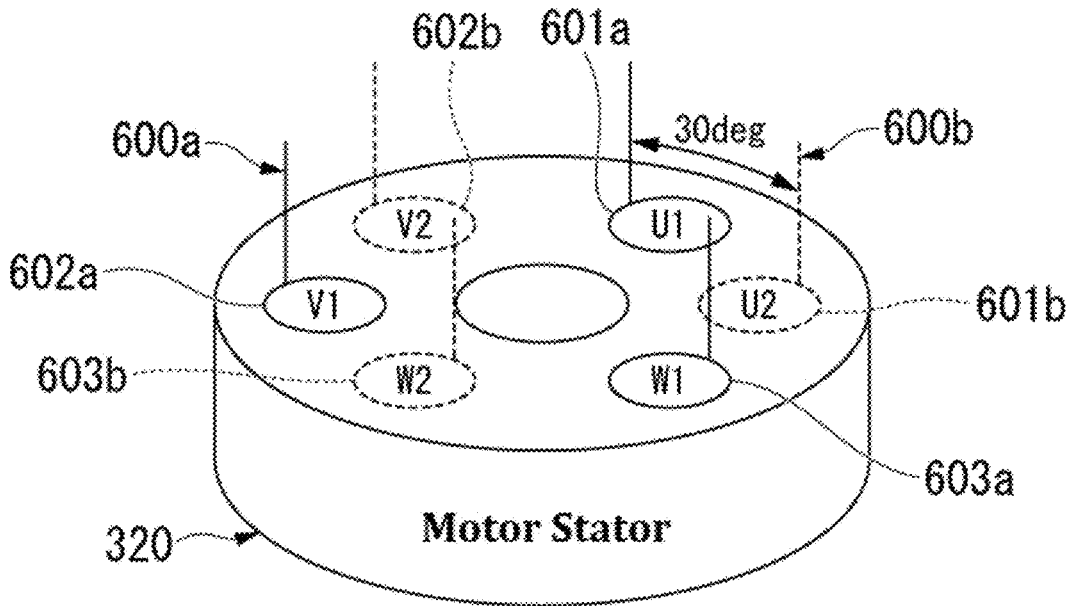
FIG. 6A shows an example of motor winding of the drive motor 320.
Figure 6B:
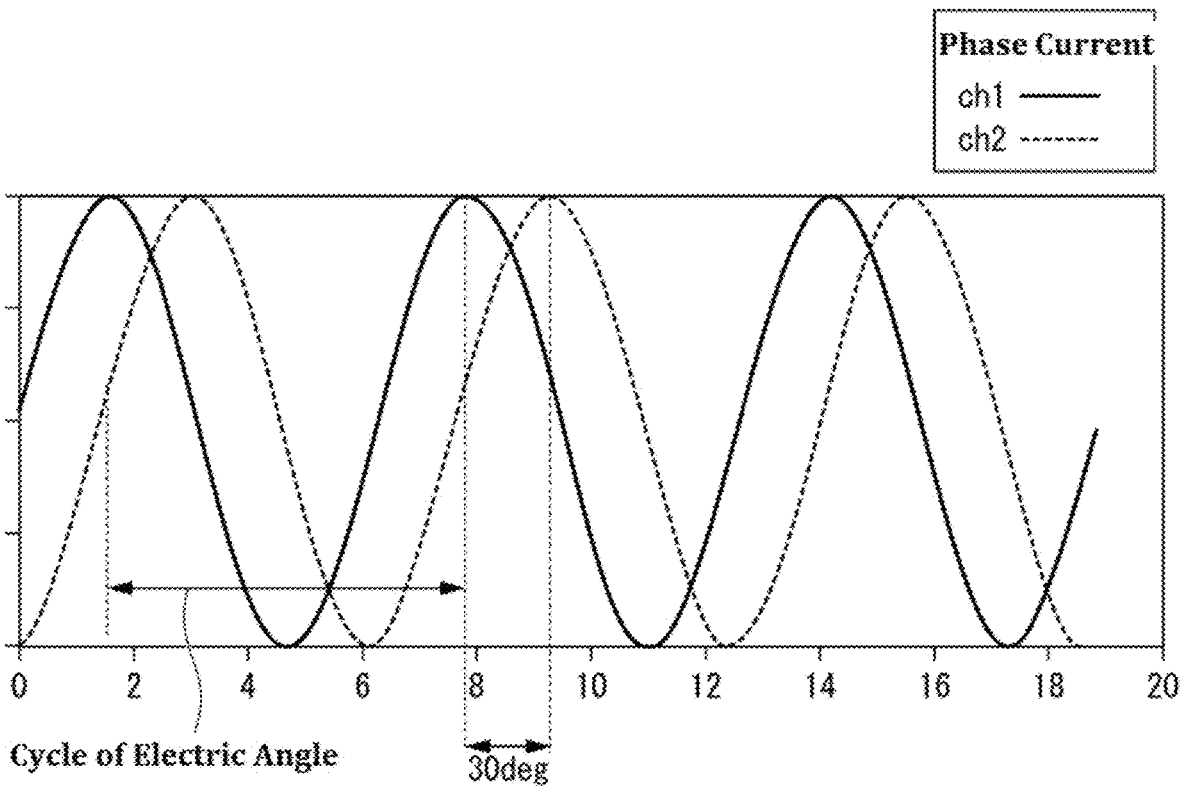
FIG. 6B shows an example of a phase current waveform.

FIG. 6A shows an example of motor winding of the drive motor 320. FIG. 6B shows an example of a phase current waveform. As shown in FIG. 6A, the drive motor 320 has first motor windings 600*a* (channel 1) and second motor windings 600*b* (channel 2). The first motor windings 600*a* includes a U1 coil 601*a*, a V1 coil 602*a*, and a W1 coil 603*a*. The second motor windings 600*b* includes a U2 coil 601*b*, a V2 coil 602*b*, and a W2 coil 603*b*.

The first motor windings 600*a* (channel 1) and the second motor winding 600*b* (channel 2) have substantially the same electrical characteristics and are cancel wound on a common stator (not shown) with a predetermined electrical angle θ (for example, 30°) offset with respect to each other. Thus, as shown in FIG. 6B, the first motor windings 600*a* and the second motor windings 600*b* are controlled so that the phase current is generated with the phase φ shifted by the electrical angle θ (30°). This allows the energizing phase difference to be optimized and the output torque to be improved. In addition, torque ripple can be reduced by setting the energizing phase difference to the electrical angle of 30°.

<Arrangement of ECU Boards>

Figure 7:
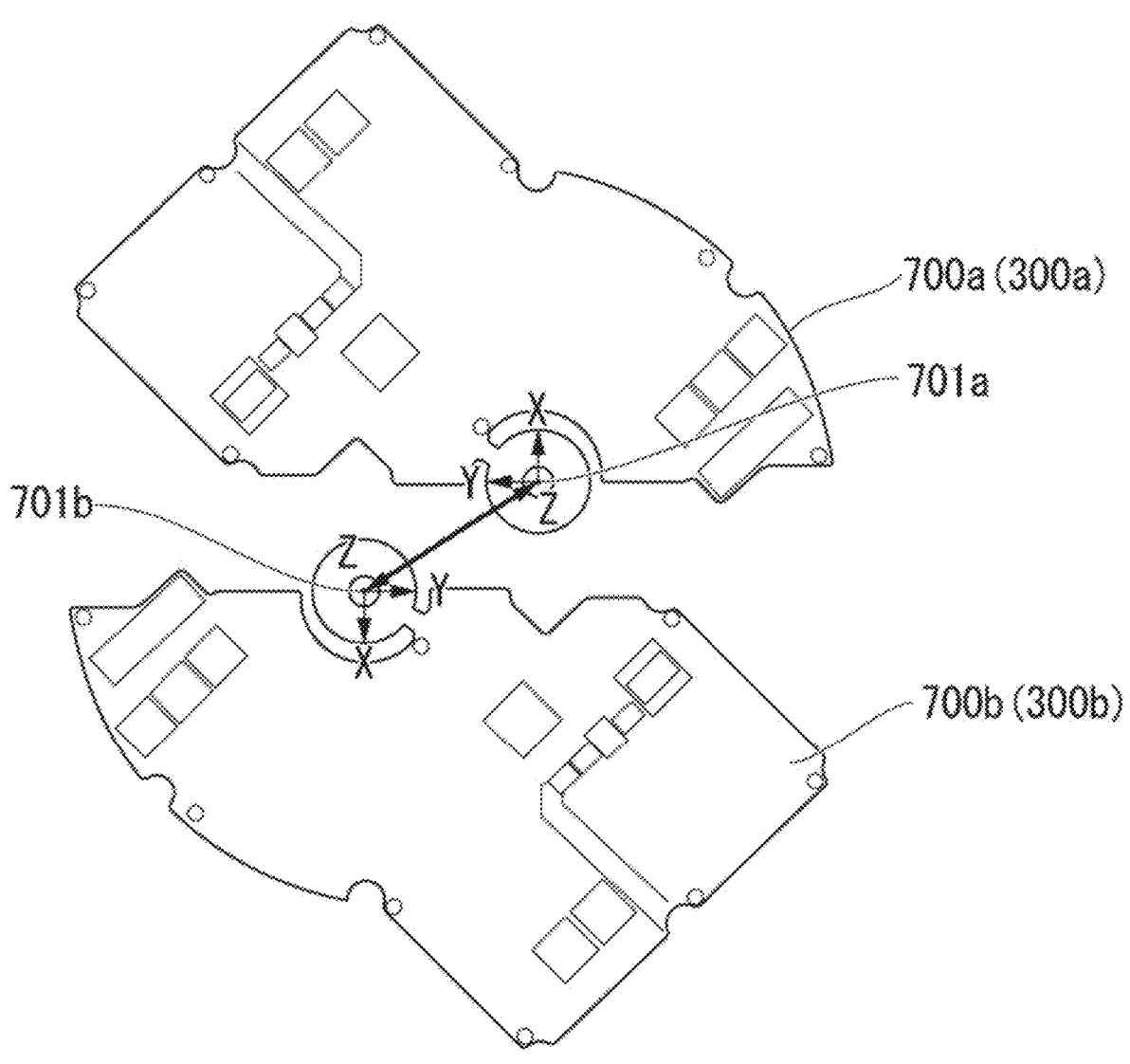
FIG. 7 shows an example of arrangement of ECU boards, which are drive instruction systems 300.

FIG. 7 shows an example of arrangement of ECU boards, which are the drive instruction systems 300. In FIG. 7, a first ECU board 700*a* has the first drive instruction system 300*a*. A second ECU board 700*b* has the second drive instruction system 300*b*. The first ECU board 700*a* and the second ECU board 700*b* are inverted (rotated) 180°. The first ECU board 700*a* and the second ECU board 700*b* are provided concentric with the output shaft of the drive motor 320 (in the Z direction in the drawing) via mounting parts 701 (701*a*, 701*b*), respectively. The first motor angle sensor 314*a* and the second motor angle sensor 314*b* are disposed on the output shaft of the drive motor 320 and detect the rotation angle of the drive motor 320 on the output shaft. Thus, in the embodiment, the first ECU board 700*a* and the second ECU board 700*b* are arranged oppositely, and also the electrical angle θ is shifted by 30°. This results in a 180°+30° (or 180°−30°) difference in the detection results of the corresponding motor angle sensors 314.

The first drive control unit 403*a* and the second drive control unit 403*b* control the drive motor 320 by generating control signals corresponding to the difference in the predetermined electrical angle θ (30°), respectively. Specifically, in the current control, the drive control units 403 shift the timing to switch the switching element by outputting PWM (Pulse Width Modulation) signals that are shifted according to the phase difference of the motor windings 600. The PWM signal is calculated based on the detection result (RPS value: Rotations Per Second) of the motor angle sensor 314 in each drive instruction system 300.

Each drive instruction system 300 is offset (calibrated) against the phase shift between the first motor windings 600*a* and the second motor windings 600*b* at the time of production. Therefore, by performing current control (FOC: Field Oriented Control) based on the common current command value and the RPS value calibrated for each drive instruction system 300, it is possible to output the PWM signals with phase shifts among the multiple drive instruction systems 300. With this configuration, the current control can be performed by using common software with different calibration values of the RPS value for the 300 drive instruction systems.

This allows for simple control, even in a configuration with the multiple ECU boards 700, because the rotational direction of the output is aligned. In addition, since each motor angle sensor 314 is on the same axis, the phase difference of each channel is clear, making it easy to detect abnormalities related to the motor angle sensor 314 and drive motor 320. Furthermore, since the channel of each drive instruction system 300 and the central axis of the drive motor 320 are aligned, the error between the drive instruction systems 300 can be reduced. Therefore, the detection accuracy of the motor angle can be improved and the position control of the pitman arm 330 can be performed with high accuracy.

<Example of Abnormality Detection: Guaranteed Angle of Pitman Arm 330>

If an abnormality occurs in at least one of the motor angle sensor 314 or the pitman arm angle sensor 315, and it is not identifiable as to which sensor has the abnormality, it is unknown whether the torque distribution process or the drive control process can be performed. Therefore, in the embodiment, the systems are controlled to operate in the fail-safe operation configuration in such cases. This will be described below.

The abnormality detection unit 411 detects the occurrence of an abnormality in at least one of the motor angle sensor 314 or the pitman arm angle sensor 315 (hereinafter referred to as "sensor abnormality"). Although the abnormality detection unit 411 detects the sensor abnormality, it shall not be able to identify which sensor has the abnormality.

The abnormality detection unit 411 detects sensor an abnormality(es) based on the rotation angle detected by the motor angle sensor 314 and the angle detected by the pitman arm angle sensor 315. For example, when the motor angle sensor 314 and the pitman arm angle sensor 315 both operate normally, the amount of difference between the value obtained from the rotation angle detected by the motor angle sensor 314 and the value obtained from the angle detected by the pitman arm angle sensor 315 falls within a predetermined range. Whereas when an abnormality occurs in one of the sensors, there will be a difference in these values, i.e., the amount of difference between these values will not be within the predetermined range.

The following illustrates the detection of sensor abnormalities. Absolute values cannot be obtained from the motor angle sensor 314. Thus, the abnormality detection unit 411 defines in advance the absolute value of the motor angle sensor 314 virtually from the detection result of the pitman arm angle sensor 315 when the drive control system 200 is activated. When the abnormality detection unit 411 obtains the detection result (RPS value) from the motor angle sensor 314, it calculates a conversion value by multiplying the RPS value by a predetermined reduction ratio (e.g., 1/500). Furthermore, the abnormality detection unit 411 determines whether the difference between the converted value (angle) and the value (angle) detected by the pitman arm angle sensor 315 falls within a certain value range. When the amount of difference is determined to be within the certain value range in this determination, the abnormality detection unit 411 determines that the system operate normally. Whereas when the amount of difference is determined to be outside the value range, the abnormality detection unit 411 detects a sensor abnormality.

Thus, in this embodiment, the drive instruction system 300 that detected the sensor abnormality as described above is set to the termination mode. While the normally operating drive instruction system 300 is set to the master mode. As a result, even when a sensor abnormality occurs in one of the drive instruction systems 300, the drive motor 320 can be driven and controlled by the other drive instruction system(s) 300 with a reduced drive torque.

<Identifying Sensor with Sensor Abnormality>

When a sensor abnormality is detected, how to identify the sensor having the abnormality will now be described. In this embodiment, the phase difference between the rotation angle of the first motor angle sensor 314a and that of the second motor angle sensor 314b is clearly obtained. Thus, when the phase difference falls within a predetermined range, it can be determined that the motor angle sensor 314 normally operates (the pitman arm angle sensor 315 abnormally operates). Whereas when the phase difference is not within the predetermined range, it can be determined that the motor angle sensor 314 operates abnormally (the pitman arm angle sensor 315 normally operates).

Specifically, assuming that a sensor abnormality occurs in the first drive instruction system 300a, while the sensor in the second drive instruction system 300b is normal. In this case, the abnormality detection unit 411 of either the first drive instruction system 300a or the second drive instruction system 300b compares the rotation angle detected by the first motor angle sensor 314a with the rotation angle detected by the second motor angle sensor 314b. When the comparison result falls within a predetermined difference range (e.g., 180°+30°), the abnormality detection unit 411 may determine that the first motor angle sensor 314a is normal, i.e., an abnormality has occurred in the first pitman arm angle sensor 315a. Even when an abnormality occurs in the pitman arm angle sensor 315a, as long as the motor angle sensor 314a is determined to be normally operating, the motor angle sensor 314a can be used instead to continue the position control.

Whereas when the comparison result of the rotation angles does not fall within the predetermined difference range, the abnormality detection unit 411a can determine that an abnormality occurs in the first motor angle sensor 314a. The above-discussed abnormality of the first pitman arm angle sensor 315a is included in the cases of calculation abnormality. Even in the state of the calculation abnormality, the drive control by the drive control unit 403a is normal. Thus, when it is determined that the pitman arm angle sensor 315a is abnormal, the configuration unit 404a does not set the first drive instruction system 300a to the termination mode but set to the slave mode. This allows the systems to operate in the fail-safe operation configuration.

<Adhesion of Foreign Substances to Pitman Arm 330>

Here, if foreign substances or the like adhere to the pitman arm 330, the abnormality detection unit 411 may erroneously detect it as a sensor abnormality. Specifically, since the first pitman arm angle sensor 315a and the second pitman arm angle sensor 315b are disposed at the similar positions, foreign substances adhered to the pitman arm 330 may cause the abnormality detection units 411 in both the drive instruction systems 300 to detect a sensor error simultaneously.

In this case, the abnormality detection unit 411 determines that the pitman arm angle sensor 315 operates abnormally. The motor angle sensor 314 may be used to control the position control continuously.

If it is determined that no sensor abnormality has occurred, each drive instruction system 300 maintains its mode. In this case, the drive instruction system 300 may notify the user that foreign substances or other objects may have adhered to the pitman arm 330.

<Control of Drive Motor 320 by Each Drive Instruction System 300>

Figure 8:
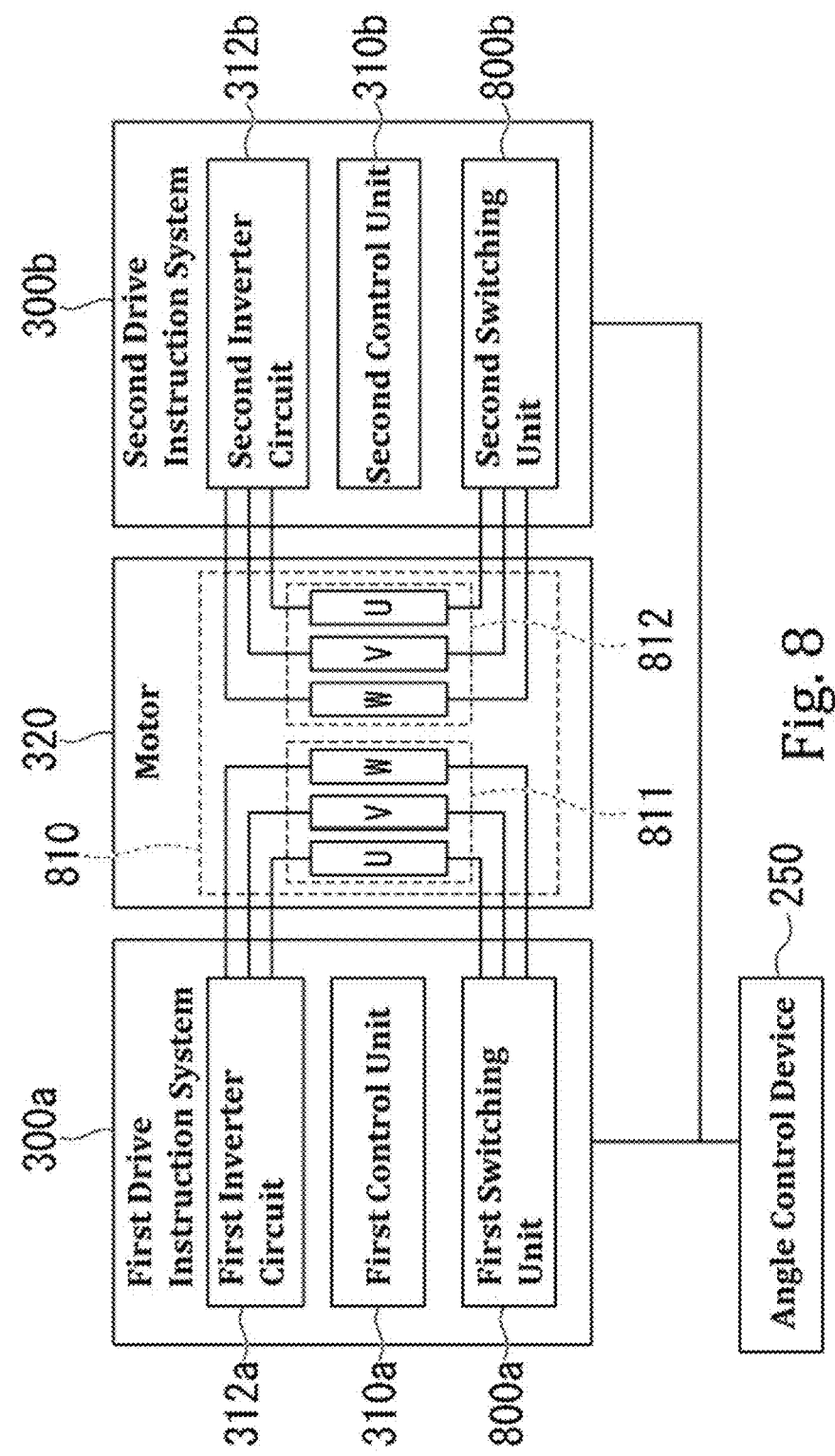
FIG. 8 shows a configuration example of the drive instruction systems 300 and the drive motor 320.
Figure 9:
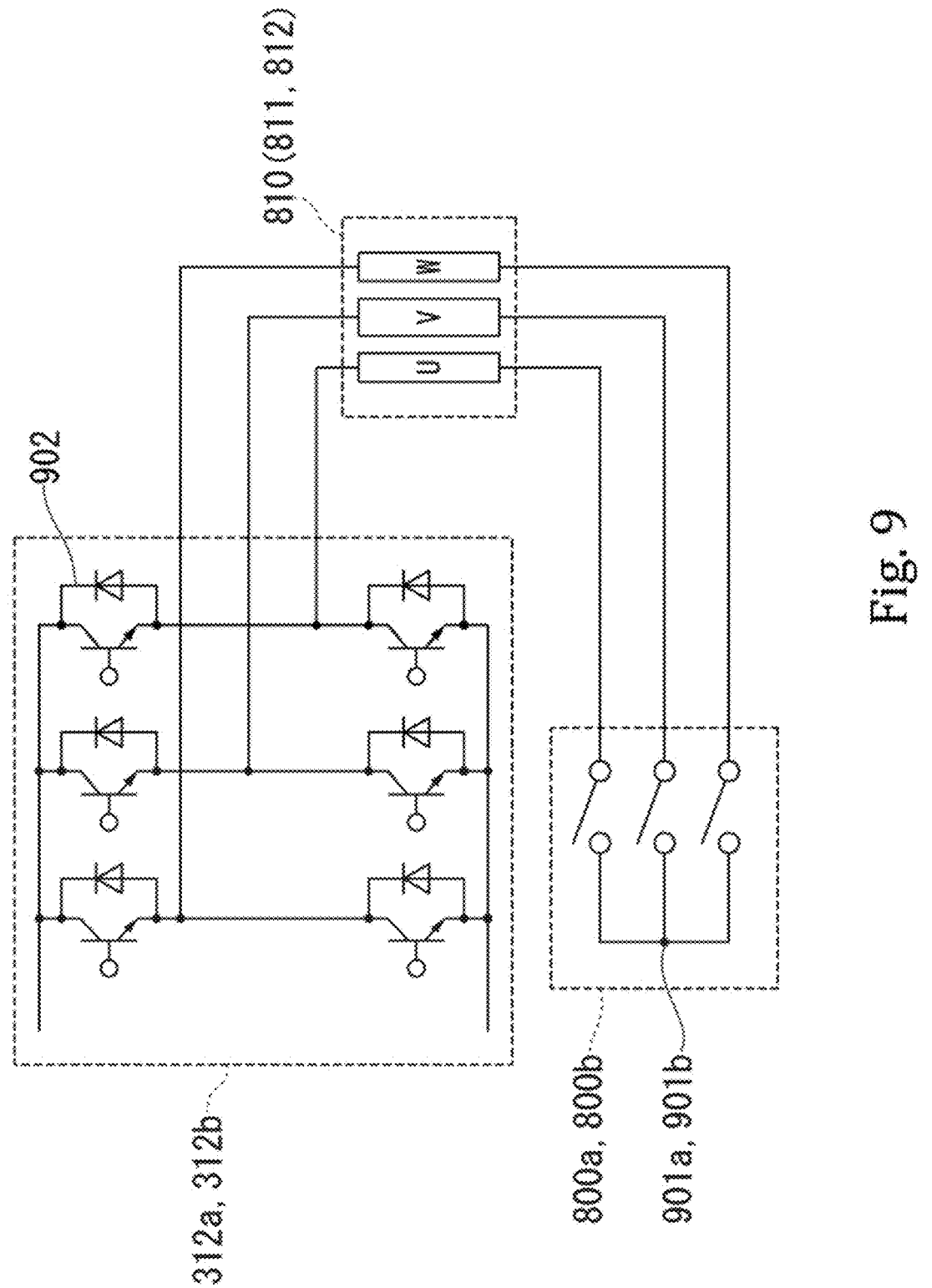
FIG. 9 schematically shows a circuit configuration of the drive instruction system 300.

A motor stop process in the event of a failure (termination mode) will now be described, along with the structure around the drive motor 320. FIG. 8 shows a configuration example of the drive instruction systems 300 and the drive motor 320. FIG. 9 schematically shows a circuit configuration of the drive instruction system 300. As shown in FIGS. 8 and 9, the drive motor 320 is controlled by the first control unit 310a and the second control unit 310b based on the instructions of the angle control device 250. The first control unit 310a and the second control unit 310b control the energizing of a coil unit 810 of the drive motor 320 and adjust the rotation of the rotor.

The coil unit 810 includes a first three-phase coil unit 811 and a second three-phase coil unit 812. The first three-phase coil unit 811 has three-phase coils and is controlled by the first control unit 310a. The second three-phase coil unit 812 has three-phase coils and is controlled by the second control unit 310b. For the coil units 811 and 812, the first three-phase coil unit 811 and the second three-phase coil unit 812 may be provided separately or combined into a single three-phase coil unit.

The first inverter circuit 312a energizes the first three-phase coil unit 811. The first inverter circuit 312a is formed of, for example, a plurality of power transistor elements 902. The first switching unit 800a controls connection of first wire connection 901a to which the end of the first three-phase coil unit 811 are connected. The first switching unit 800a is formed of, for example, a plurality of power transistor elements (not shown). The first control unit 310a controls the first inverter circuit 312a and the first switching unit 800a.

The first control unit 310a controls the first three-phase coil unit 811 by, for example, PWM controlling the on-off timing of each power transistor element 902 of the first inverter circuit 312a to generate a pulse current. The first control unit 310a may control the first three-phase coil unit 811 by any control method other than the PWM control. The first control unit 310a, for example, puts the first switching unit 800a into the open state to stop the power supply to the first three-phase coil unit 811 in the event of a failure of the first drive instruction system 300a (termination mode). This ensures the safety of the drive control device 240 in the event of a malfunction.

The second inverter circuit 312b energizes the second three-phase coil unit 812. The second inverter circuit 312b is formed of, for example, a plurality of power transistor elements 902. The second switching unit 800b controls connection of second wiring connection 901b to which the ends of the second three-phase coil unit 812 are connected. The second switching unit 800b is formed of, for example, a plurality of power transistor elements (not shown). The second control unit 310b controls the second inverter circuit 312b and the second switching unit 800b.

The second control unit 310b controls the second three-phase coil unit 812 by, for example, PWM controlling the on-off timing of each power transistor element 902 in the second inverter circuit 312b to generate a pulse current. The second control unit 310b may control the second three-phase coil unit 812 by any control method other than the PWM control. For example, the second control unit 310b, for example, puts the second switching unit 800b into the open state to stop the power supply to the second three-phase coil unit 812 in the event of a failure of the second drive instruction system 300b (termination mode). This ensures the safety of the drive control device 240 in the event of a malfunction.

The first control unit 310a controls 50% of the output of the drive motor 320 by controlling the first three-phase coil unit 811. The second control unit 310b controls 50% of the output of the drive motor 320 by controlling the second three-phase coil unit 812. With this configuration, the drive control device 240 can ensure at least half of the output even if either the first or second drive instruction system 300a or 300b fails.

Alternatively, the first control unit 310a may control 100% of the output of the drive motor 320 by controlling the first three-phase coil unit 811. In this case, the second control unit 310b does not control the drive motor 320. Alternatively, the second control unit 310b may control 100% of the output of the drive motor 320 by controlling the second three-phase coil unit 812. In this case, the first control unit 310a does not control the drive motor 320. According to such control, when one of the first or second drive instruction system 300a or 300b fails, the drive control device 240 can switch to the other of the drive instruction systems 300 to ensure 100% output.

In the case where one of the first control unit 310a or the second control unit 310b controls the drive motor 320, switching between the first control unit 310a and the second control unit 310b for controlling the drive motor 320 may be performed at predetermined timings such as a preset period or a preset number of times of operation. This configuration distributes the loads in the control of the drive motor 320. The balance between the first control unit 310a or the second control unit 310b in the control of the drive motor 320 may be adjusted to any ratio. This allows redundancy in the control of the drive motor 320. It also makes it possible to desirably select an efficient power balance in the control of the drive motor 320.

<Process of Stopping Motor in Event of Fault>

The switching unit 800 switches between the connection and disconnection of the wiring connection 901 to which the end of the coil unit 810 are connected. Here, if one drive instruction system 300 causes the drive motor 320 to operate while the other drive instruction system 300 is stopping the drive motor 320 (termination mode), a back electromotive force will be generated (assuming the reduction mode is initiated). This may result in the generation of brake torque, which may inhibit the generation of appropriate drive torque. To prevent the generation of such brake torque, in the embodiment, the disconnecting unit 409 performs a motor stop process when the drive instruction system 300 is set to the termination mode by the configuration unit 404. The motor stop process stops the supply of power to the drive motor 320 and also switches the switching unit 800 to disconnect. This reduces the generation of the back electromotive force.

<Timing of Mode Switching by Configuration Unit 404>

Timing of mode switching by the configuration unit 404 will be now described. First, the abnormality determination timing is described. Once an abnormality is detected, the control unit 310 confirms the abnormality at an abnormality determination time before which the abnormality detection continues for a certain period of time or longer, and stops the drive motor 320. In other words, the abnormality determination timing is the timing to start a process to transition to a safe state, for example, the timing to start the motor stop process. Whereas when the control unit 310 does not detect an abnormality for more than a certain period of time, the control unit 310 does not confirm the abnormality, i.e., it does not stop the drive motor 320. The abnormality includes at least one of the following: sensor abnormality detected by the abnormality detection unit 411, calculation abnormality detected by the calculation abnormality detection unit 405, and drive control abnormality detected by the drive control abnormality detection unit 407.

When an abnormality is detected, the configuration unit 404 changes the mode before the abnormality is confirmed. In other words, the configuration unit 404 changes the mode at the stage when an abnormality is suspected, even if the abnormality is not detected for more than a certain period of time.

Figure 10:
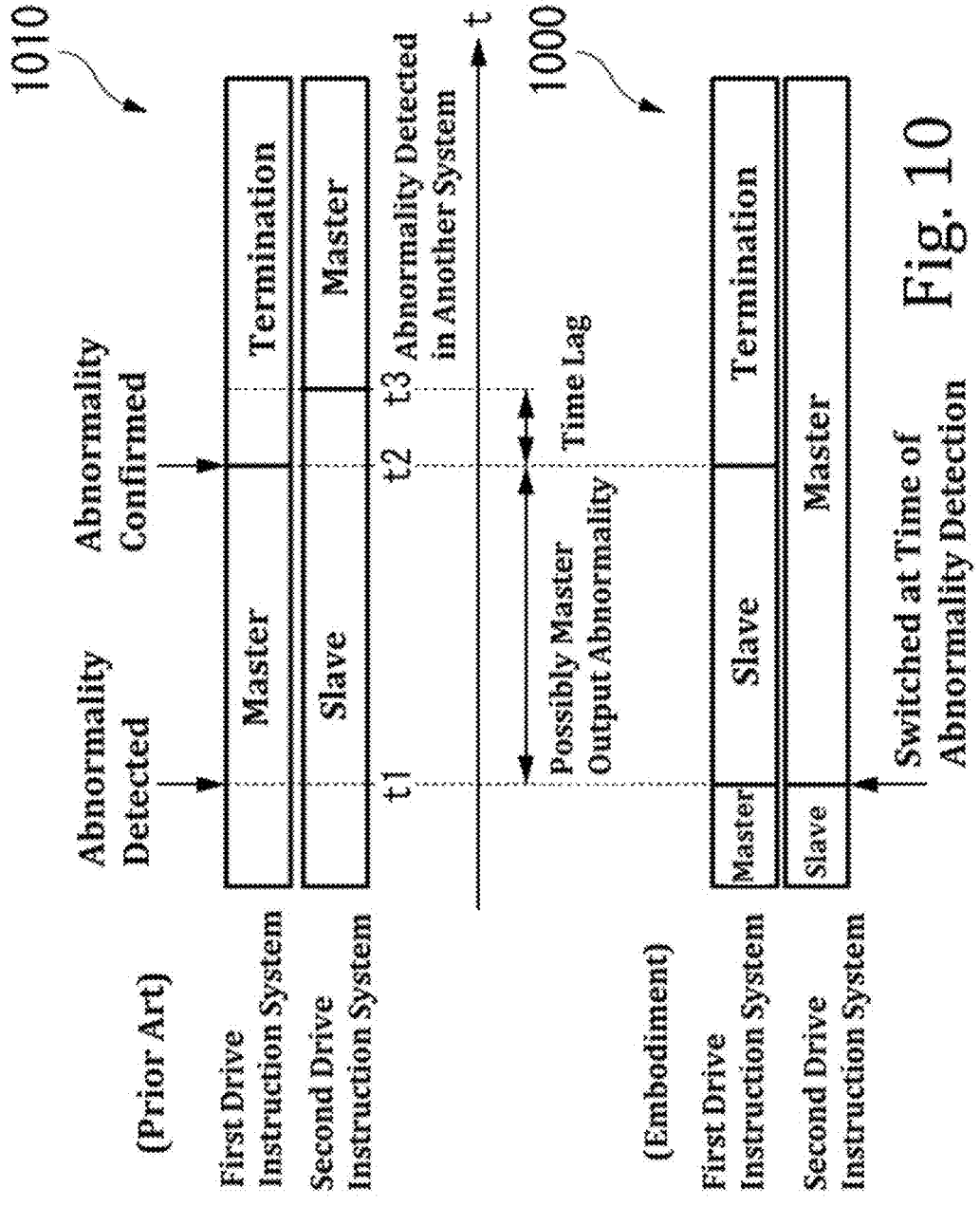
FIG. 10 shows an example of a mode switching timing related to the embodiment compared to a conventional mode switching timing.

FIG. 10 shows an example of a mode switching timing related to the embodiment compared to a conventional mode switching timing. Conventional mode switching is, for example, mode switching pertaining to a general master-slave redundant system. In conventional mode switching, occurrence of a failure is usually confirmed after a certain amount of time has elapsed after the detection of the failure as system's failure handling process. In the conventional mode switching, when the drive instruction system 300 on the master side detects a failure, the slave side is typically switched to the master once the motor drive control of the drive instruction system 300 on the master side is stopped. In FIG. 10, although the fail operation configuration is illustrated, the same applies to the fail-safe operation configuration.

In FIG. 10, time chart 1010 shows the conventional timing of mode switching. Timing t1 is the timing when an abnormality is detected in the first drive instruction system 300a. Timing t2 is the timing when the abnormality is confirmed in the first drive instruction system 300a. In the conventional art, the first drive instruction system 300a switches from the master mode to the slave mode at the timing t2 when the abnormality is confirmed. In the conventional art, the second drive instruction system 300*b* switches from the slave mode to the master mode at timing t3, which is later than the abnormality confirmation timing t2. Thus, the drive motor 320 could be controlled with an inappropriate value before the mode was switched.

In FIG. 10, time chart 1000 shows the timing of the mode switching. As shown in the time chart 1000, at timing t1, the first drive instruction system 300*a* is switched from the master mode to the slave mode, and the second drive instruction system 300*b* is switched from the slave mode to the master mode. This allows the mode to be switched quickly, thereby suppressing the possibility of controlling the drive motor 320 with an inappropriate value. When no abnormality is detected at the abnormality determination timing t2 after the mode is switched, the system may be controlled to be back to the original mode before the switching.

<Processes Performed by Drive Control Device 240>

Processes performed by the drive control device 240 will now be described with reference to FIGS. 11 to 13.

<Process Related to Fail Operation Configuration>

The process related to the fail operation configuration is hereunder described with reference to FIG. 11. FIG. 11 is a flowchart showing an example of the process related to the fail operation configuration. Steps S1201 to S1207 of the process shown in FIG. 11 are described as being performed by the drive instruction system 300 that is set in the master mode at the start of the flowchart. Steps S1208 to S1214 shown in FIG. 11 are described as being performed by the drive instruction system 300 that is set in the slave mode at the start of the flowchart.

Figure 11:
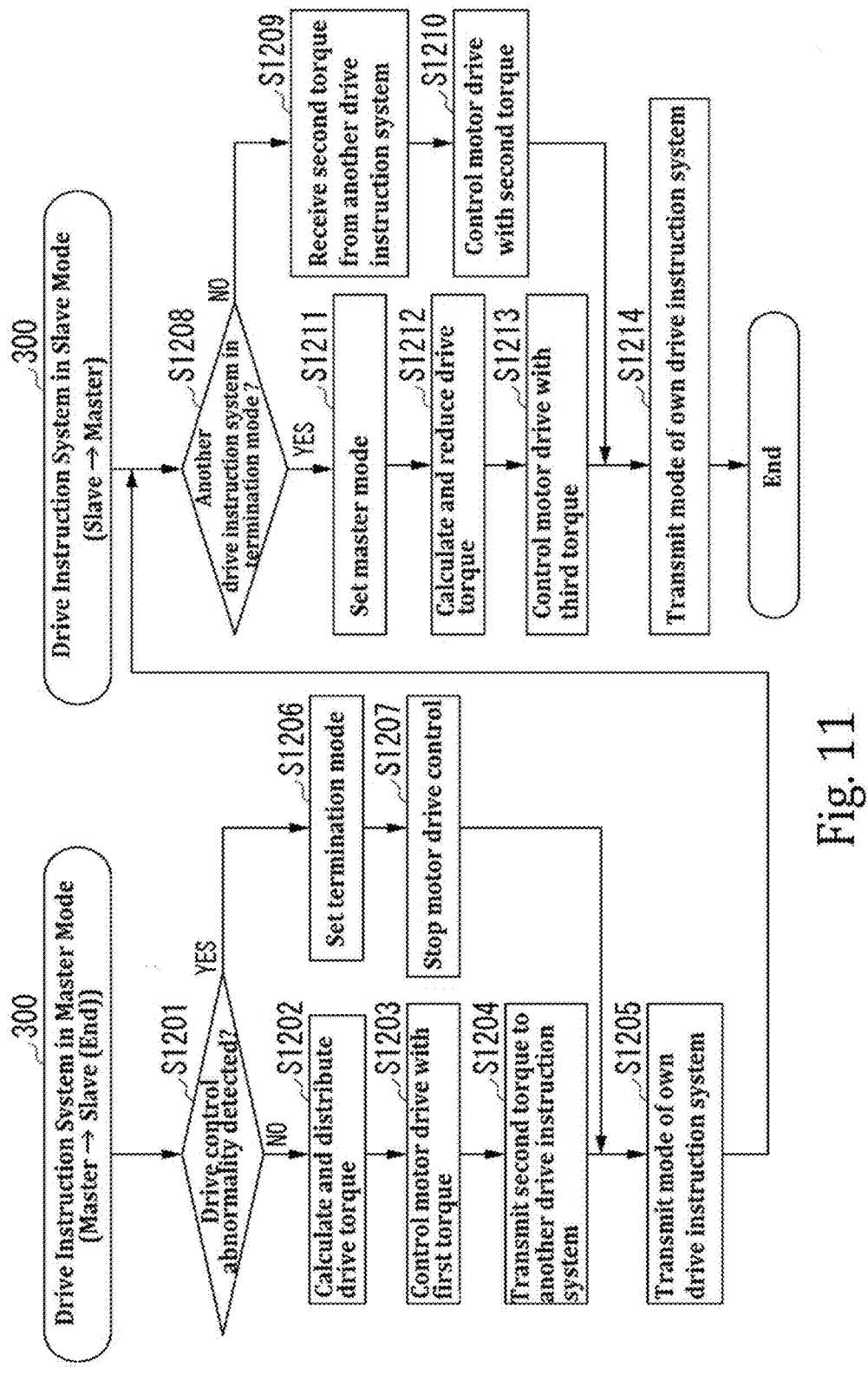
FIG. 11 is a flowchart showing an example of processes of a fail operation.

In FIG. 11, the drive instruction system 300 in the master mode determines whether a drive control abnormality is detected by the drive control abnormality detection unit 407 (step S1201). When no drive control abnormality is detected (step S1201: NO), the calculation unit 401 calculates the drive torque and the distribution unit 402 divides the drive torque into the first torque and the second torque (step S1202).

The drive control unit 403 then controls the drive motor 320 with the first torque (step S1203). The drive instruction system 300 in the master mode also transmits the second torque to the other drive instruction system 300 (step S1204). Furthermore, the communication unit 400 transmits the current mode of the drive instruction system to which the communication unit 400 belongs to the other drive instruction system 300 and the angle control system 251 on the same channel (step S1205). If the mode is not changed, step S1205 may be omitted.

When a drive control abnormality is detected in step S1201 (step S1201: YES), the configuration unit 404 sets the drive instruction system to which the configuration unit 404 belongs to the termination mode (step S1206). Then, the drive control unit 403 stops the drive control of the drive motor 320 at the abnormality confirmation timing (step S1207) and proceeds to step S1205.

The drive instruction system 300 in the slave mode determines whether the other drive instruction system(s) 300 has been set to the termination mode (step S1208). When the other drive instruction system 300 has not been set to the termination mode (step S1208: NO), the communication unit 400 receives the second torque from the other drive instruction system(s) 300 (step S1209). The drive control unit 403 then controls the drive motor 320 with the second torque (step S1210) and proceeds to step S1214.

When the other drive instruction system 300 is set to the termination mode in step S1208 (step S1208: YES), the configuration unit 404 sets the drive instruction system to which the configuration unit 404 belongs to the master mode (step S1211). Then, the calculation unit 401 in the same instruction system calculates the drive torque, and the reduction unit 410 reduces the drive torque to the third torque (step S1212).

The drive control unit then drives and controls the drive motor 320 with the third torque reduced by the reduction unit 410 (step S1213). The communication unit 400 subsequently transmits the current mode of its own drive instruction system to the other drive instruction system 300 and the angle control system 251 in the same channel (step S1214), and the process ends. Note that when the mode is not changed, step S1214 may be omitted.

<Process Related to Fail-Safe Operation Configuration>

The process related to the fail-safe operation configuration is hereunder described with reference to FIG. 12. FIG. 12 is a flowchart showing an example of the process related to the fail-safe operation configuration. The process including steps S1301 to S1306 and the process including steps S1314 to S1317 shown in FIG. 12 are described as being performed by the drive instruction system 300 that is set in the master mode at the start of the flowchart. The process including steps S1307 to S1313 shown in FIG. 12 are described as being performed by the drive instruction system 300 that is set in the slave mode at the start of the flowchart.

Figure 12:
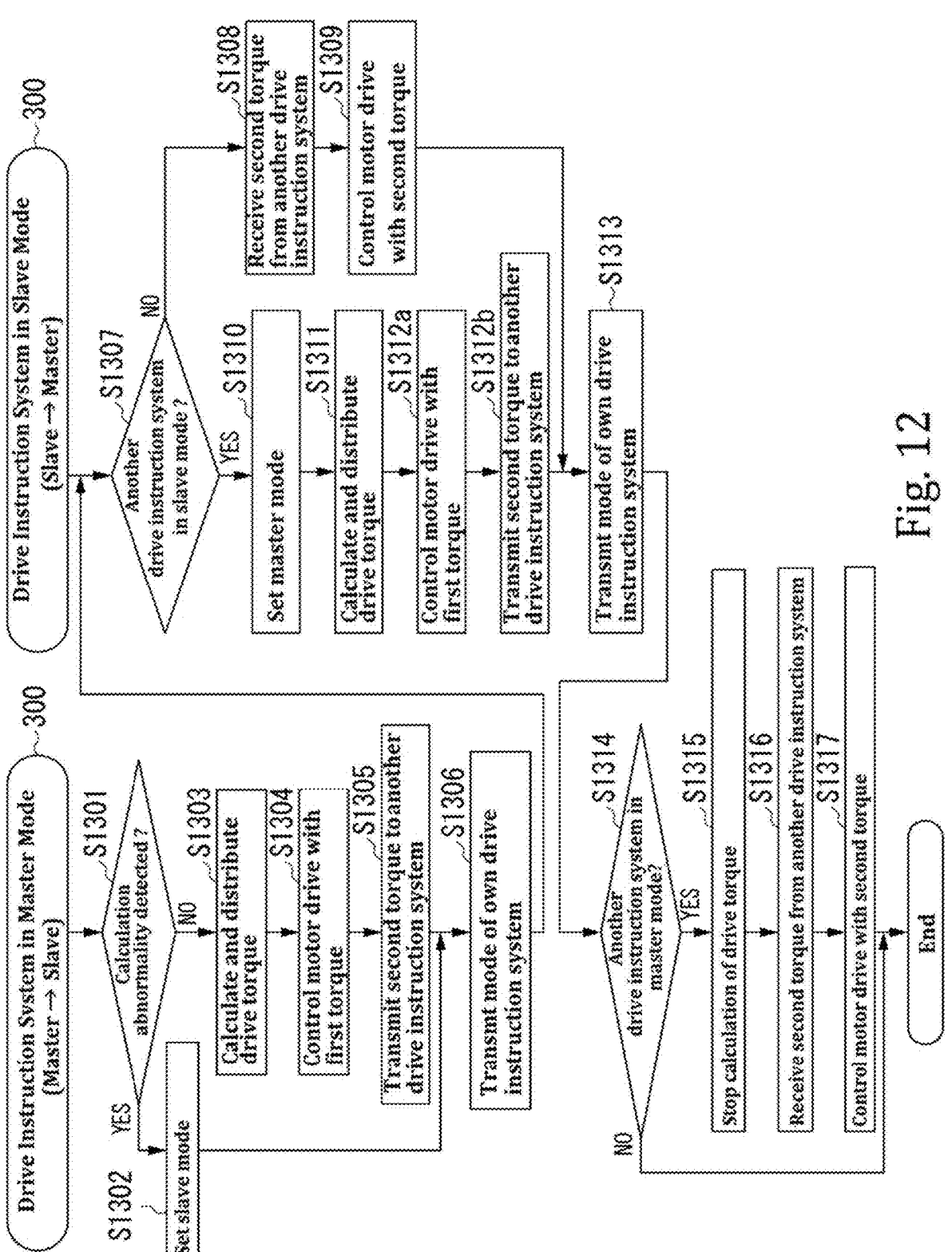
FIG. 12 is a flowchart showing an example of processes of a fail safe operation.

In FIG. 12, the drive instruction system 300 in the master mode determines whether a calculation abnormality is detected by the calculation abnormality detection unit 405 (step S1301). When a calculation abnormality is detected (step S1301: YES), the configuration unit 404 sets the drive instruction system to which the configuration unit 404 belongs to the slave mode (step S1302) and proceeds to step S1306. Note that setting to the slave mode is performed prior to the abnormality confirmation timing of the calculation abnormality.

Whereas when no calculation abnormality is detected (step S1201: NO), the calculation unit 401 calculates the drive torque and the distribution unit 402 divides the drive torque into the first torque and the second torque (step S1303).

The drive control unit 403 then controls the drive motor 320 with the first torque (step S1304). The drive instruction system 300 in the master mode also transmits the second torque to the other drive instruction system 300 (step S1305). Furthermore, the communication unit 400 transmits the current mode of the drive instruction system to which the communication unit 400 belongs to the other drive instruction system 300 and the angle control system 251 in the same channel (step S1306). Note that when the mode is not changed, step S1306 may be omitted.

The drive instruction system 300 in the slave mode determines whether the other drive instruction system(s) 300 has been set to the slave mode (step S1307). When the other drive instruction system 300 is not set to the slave mode (step S1307: NO), the communication unit 400 receives the second torque from the other drive instruction system(s) 300 (step S1308). The drive control unit 403 then controls the drive motor 320 with the second torque (step S1309) and proceeds to step S1313.

When the other drive instruction system 300 is set to the slave mode in step S1307 (step S1307: YES), the configuration unit 404 sets the drive instruction system to which the configuration unit 404 belongs to the master mode (step S1310). Then, the calculation unit 401, which is provided in the same drive instruction system, calculates the drive torque, and the distribution unit 402 divides the drive torque into the first torque and the second torque (step S1311).

The drive control unit 403 then drives and controls the drive motor 320 with the first torque distributed by the distribution unit 402 in the drive instruction system to which the drive control unit 403 belongs (step S1312a). The drive instruction system 300 in the master mode also transmits the second torque to the other drive instruction system 300 (step S1312b). Subsequently, the communication unit 400 transmits the current mode of the drive instruction system to which the communication unit 400 belongs to the other drive instruction system 300 and the angle control system 251 on the same channel (step S1313). Note that when the mode is not changed, step S1313 may be omitted.

The drive instruction system 300 that was initially set in the master mode determines whether the other drive instruction system 300 has been set to the master mode (step S1314). When the other drive instruction system 300 is not set to the master mode (step S1314: NO), the drive instruction system 300 ends the process. Whereas when the other drive instruction system 300 is set to the master mode (step S1314: YES), the drive instruction system 300 stops the calculation of the drive torque by the calculation unit 401 in its drive instruction system (step S1315). The communication unit 400 then receives the second torque calculated by the other drive instruction system 300 from the other drive instruction system 300 (step S1316). The drive control unit 403 subsequently controls the drive motor 320 with the second torque (step S1317) and ends the process.

<Process When Other Drive Instruction System 300 on Other Axle 120 Changes Mode>

Figure 13:
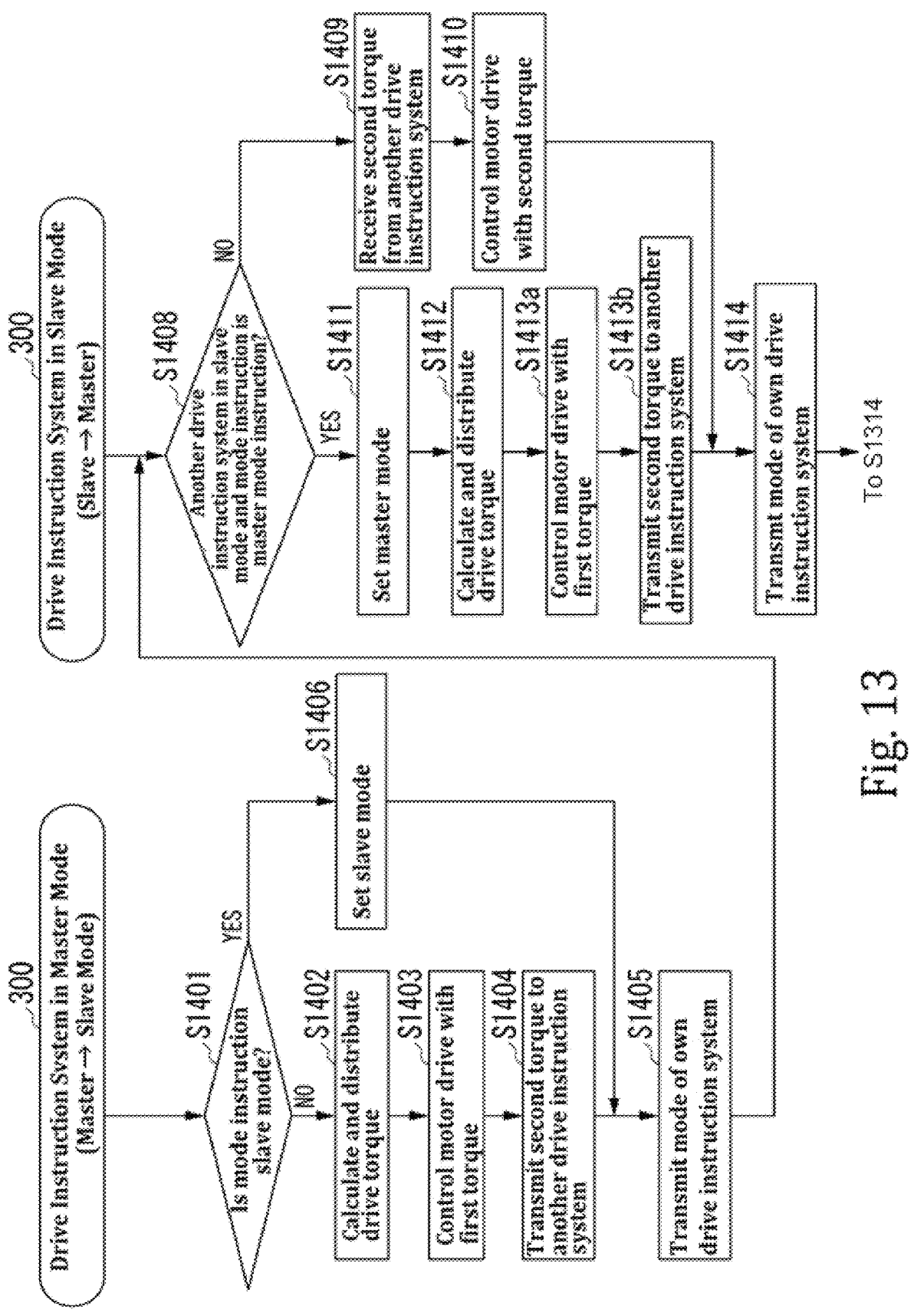
FIG. 13 is a flowchart showing an example of processes when the mode of the drive instruction system 300 of the other axle 120 is switched.

FIG. 13 is a flowchart showing an example of processes when other drive instruction system 300 of other axle 120 is switched to a different mode. The process including steps S1401 to S1407 shown in FIG. 13 are described as being performed by the drive instruction system 300 that is set in the master mode at the start of the flowchart. The process including steps S1408 to S1414 are described as being performed by the drive instruction system 300 that is set in the slave mode at the start of the flowchart. The process related to the fail-safe operation configuration is hereunder described with reference to FIG. 13.

In FIG. 13, the drive instruction system 300 in the master mode determines whether the mode command transmitted from the angle control device 250 is the slave mode command (step S1401). When the mode command is not the slave mode command (step S1401: NO), the calculation unit 401 calculates the drive torque and the distribution unit 402 divides the drive torque into the first torque and the second torque (step S1402).

The drive control unit 403 then controls the drive motor 320 with the first torque (step S1403). The drive instruction system 300 transmits the second torque to the other drive instruction system 300 (step S1404). Furthermore, the communication unit 400 transmits, to the other drive instruction system 300 and the angle control system 251 on the same channel, the current mode of the drive instruction system 300 to which the communication unit 400 belongs (step S1405).

In step S1401, when the mode command is the slave mode command (step S1401: YES), the configuration unit 404 sets the drive instruction system 300 to which the configuration unit 404 belongs to the slave mode (step S1406) and proceeds to step S1405. Note that setting to the slave mode is performed prior to the abnormality confirmation timing of the calculation abnormality.

The drive instruction system 300 in the slave mode determines whether the condition that the other drive instruction system 300 is set in the slave mode and the mode command is the master mode command is satisfied (step S1408). When the condition is not satisfied (step S1408: NO), the communication unit 400 receives the second torque from the other drive instruction system 300 (step S1409). The drive control unit 403 then controls the drive motor 320 with the second torque (step S1309) and proceeds to step S1313.

When the condition is satisfied in step S1408 (step S1408: YES), the configuration unit 404 in the drive instruction system sets the drive instruction system 300 to the master mode (step S1411). Then, the calculation unit 401 in the drive instruction system calculates the drive torque, and the reduction unit 410 distributes the drive torque (step S1412).

The drive control unit 403 then controls the drive motor 320 with the first torque (step S1413a). The drive instruction system 300 in the master mode also transmits the second torque to the other drive instruction system 300 (step S1413b). Next, the drive indication system 300 transmits its mode to the other drive indication system(s) 300 and the angle control system 251 on the same channel (step S1414), moves to step S1314 (steps S1314 to S1317) in FIG. 12, and ends the process.

As explained above, the drive control device 240 in the embodiment has the redundant configuration with a plurality of drive instruction systems 300, one drive instruction system 300 performs the torque distribution process, and the drive control units 403 in the multiple drive instruction systems 300 synchronously control the drive motor 320 with the distributed torque, respectively. This reduces the chance of inconsistency in control of the drive motor 320 among the plurality of drive instruction systems 300, and thus enables highly accurate position control of the pitman arm 330 with a simple configuration and control. In addition, in the embodiment, the drive torques of the plurality of drive instruction systems 300 are distributed according to a predetermined ratio. Thus, it is possible to determine whether appropriate drive control is being performed by comparing the torque estimated from the current value measured by the current sensor 313 in each drive instruction system 300 with the drive torque after the distribution when the motor is operated at that torque. Therefore, the position control of the pitman arm 330 can be performed with high accuracy.

In the drive control device 240 of the embodiment, the drive instruction system 300 is set to the master mode or slave mode, and the torque distribution is performed in the master mode, while the torque distribution is not performed in the slave mode. As a result, even when the drive instruction system 300 in the master mode fails, by setting the drive instruction system 300 in the slave mode to the master mode, it is possible to synchronously control the drive motor 320 with the same drive torque as before. Therefore, even when one of the drive instruction systems 300 fails, inconsistency in control of the drive motor 320 between the multiple drive instruction systems 300 can be suppressed and the position control of the pitman arm 330 can be performed with high precision.

In the drive control device 240, each of the drive instruction systems 300 sets itself to the slave mode when a calculation abnormality is detected by the calculation abnormality detection unit 405. This allows the drive instruction systems 300 to be controlled so that the torque distribution process is not performed when a calculation abnormality is detected. Thus, when a calculation abnormality is detected, it is possible to suppress the incorrect calculation of the drive torque and the incorrect distribution of the drive torque. Therefore, it is possible to suppress inconsistency in control of the drive motor 320 between the multiple drive instruction systems 300.

In the drive control device 240, each of the drive instruction systems 300 sets itself to the master mode when it obtains the calculation abnormality information. This allows the drive instruction system 300 in which no calculation abnormality has occurred to perform the torque distribution. Therefore, even when a calculation abnormality is detected in the other drive instruction system 300, the drive motor 320 can be synchronously controlled with the same drive torque as before.

In the drive control device 240, each of the drive instruction system 300 sets itself to the termination mode when a drive control abnormality is detected. This allows the drive instruction system 300 not to perform drive control of the drive motor 320 when a drive control abnormality is detected. Therefore, it is possible to suppress incorrect drive control when a drive control abnormality is detected. Therefore, it is possible to suppress inconsistency in control of the drive motor 320 between the multiple drive instruction systems 300.

In the drive control device 240, each of the drive instruction system 300 sets itself to the reduction mode when the drive control abnormality information is obtained. In the reduction mode, the drive instruction system 300 prohibits the distribution process by the distribution unit 402 and controls the drive motor 320 with the third torque, which is reduced from the drive torque. With this configuration, even when one drive instruction system 300 is unable to perform the drive control, it is possible for the other drive instruction system 300 to control the drive motor 320 in the range of, for example, 50% to 80% of the drive torque.

In the drive control device 240, each of the drive instruction systems 300 detects a sensor abnormality based on the detection results of the motor angle sensor 314 and the pitman arm angle sensor 315. This enables accurate detection of sensor abnormalities based on components related to the position control of the pitman arm 330 without the need to add separate components.

In the embodiment, the motor angle sensor 314 is concentric with the output shaft of the drive motor 320. The drive motor 320 includes the plurality of motor windings that are provided corresponding to the drive control units 403 and that are offset from each other by a predetermined angle (30°). Furthermore, the drive control unit 403 controls the drive motor 320 by generating a control signal corresponding to the predetermined angle (30°) difference. This allows for simple control, even in a configuration with the multiple ECU boards 700, because the rotational direction of the output is aligned. In addition, since each motor angle sensor 314 is on the same axis, the phase difference of each channel is clear, making it easy to detect abnormalities related to the motor angle sensor 314 and drive motor 320. Furthermore, since the channel of each drive instruction system 300 and the central axis of the drive motor 320 are aligned, the error between the drive instruction systems 300 can be reduced. Therefore, the detection accuracy of the rotation angle of the drive motor 320 can be improved and the position control of the pitman arm 330 can be performed with high accuracy.

When an abnormality is detected by the abnormality detection unit 411, each drive instruction system 300 in the drive control device 240 changes its mode at a timing before the abnormality is confirmed. This allows the mode to be switched quickly, thereby reducing the possibility of controlling the drive motor 320 with an inappropriate value.

When the drive instruction system 300 is set to the termination mode, the drive control device 240 stops the supply of power to the drive motor 320 through the drive instruction system 300 and also disconnects the wiring connection 901 (FIG. 9) where the end of the coil unit 810 (FIG. 8, FIG. 9) of the drive motor 320 is wired. This suppresses the generation of the back electromotive force at the start of the reduction mode. Therefore, generation of brake torque can be suppressed, and thus the drive motor 320 can be controlled with an appropriate torque.

In the embodiment, the drive control device 240 receives a mode command from the angle control device 250 according to the mode set in the angle control device 250, and sets the drive instruction system 300 to the mode indicated by the mode command. This allows the same mode throughout the drive control system 200 to be set to the multiple drive instruction systems 300 in each of the drive control devices 240a to 240n, thereby achieving simple control through coordination.

In each of the above embodiments, each control device (angle control system 251, drive instruction system 300) and functional units provided by the control systems (communication unit 400, calculation unit 401, distribution unit 402, drive control unit 403, configuration unit 404, calculation abnormality detection unit 405, calculation abnormality obtaining unit 406, drive control abnormality detection unit 407, drive control abnormality obtaining unit 408, disconnection unit 409, reduction unit 410, and abnormality detection unit 411) are described such that they are provided in a single computer device. However, they may be provided in other computer devices. For example, they may be provided on an external server. In addition, the number of the computer device in which these units are provided is not limited to one, but may be two or more. Specifically, for example, some of these functional units may be provided in one computer device and other functional units may be provided in other computer device(s).

A program for realizing the drive control device 240 described above may be stored on a computer-readable storage medium, and the program may be loaded to a computer system to execute the program. The term "computer system" as used herein includes hardware such as an OS and peripheral devices. The "computer-readable storage medium" refers to a storage device such as portable medium including, a Universal Serial Bus (USB) flash memory, a Solid State Drive (SSD), a flexible disc, a magneto-optical disc, a ROM, and a CD-ROM, and a hard disk built-in to the computer system. Further, the "computer-readable storage medium" includes storage that retain the program for some period of time, like a volatile memory (for example, RAM) in a computer system that operates as a server or a client receiving the program through a network such as the Internet or a communication line such as a telephone line. The computer program mentioned above may be transmitted from a computer system that includes a storage device or the like storing the program to another computer system through a transmission medium or by a transmission wave in a transmission medium. The "transmission medium" for transmitting the program refers to a medium that operates to transmit information, like a network (communication network) such as the Internet or a communication line (communication wire) such as the telephone line. Only a part of the functions described above may be implemented in the above program. Further, the functions described above may be implemented by a combination of the above program and other programs previously stored on the computer system. That is, the above program may be what is called a difference file (a difference program).

The foregoing is the description of the embodiments of the present disclosure with reference to the drawings. Specific configurations are not limited to the above embodiments but include design modifications within the purport of the present disclosure.

According to the foregoing embodiments disclosed herein, a plurality of functions are distributively provided. Some or all of the functions may be integrated. Any one of the functions may be partly or entirely segmented into a plurality of functions, which are distributively provided. Irrespective of whether or not the functions are integrated or distributed, they are acceptable as long as they are configured to attain the object of the disclosure.

What is claimed is:

1. A drive control device comprising a plurality of drive instruction systems, each of the plurality of drive instruction systems including:

a communication unit receiving an instruction about a position of a pitman arm from a higher-level device;

an angle detection unit detecting an angle of the pitman arm;

a calculation unit calculating a drive torque for the pitman arm based on the instruction and the angle of the pitman arm;

a distribution unit distributing the drive torque according to a predetermined ratio; and a drive control unit controlling a drive unit, wherein one of the plurality of drive instruction systems performs a torque distribution process including a calculation process by the calculation unit and a distribution process by the distribution unit, and wherein the drive control unit in each of the plurality of drive instruction systems synchronously controls the drive unit with a torque distributed by the torque distribution process, wherein each of the plurality of drive instruction systems further includes a configuration unit that sets the drive instruction system to a master mode or a slave mode, the drive instruction system performs the torque distribution process in the master mode, and the drive instruction system does not perform the torque distribution process in the slave mode, a calculation abnormality detection unit detects a calculation abnormality indicating that the torque distribution process is unable to be performed, and a drive control abnormality detection unit that detects a drive control abnormality indicating occurrence of an abnormality in the drive control unit, wherein the configuration unit is configured to:

set own drive instruction system to the slave mode, when the calculation abnormality is detected by the calculation abnormality detection unit, and set the own drive instruction system to a termination mode to terminate operation of the own drive instruction system, when the drive control abnormality is detected by the drive control abnormality detection unit.

2. The drive control device of claim 1, wherein the calculation abnormality detection unit is configured to detect the calculation abnormality, which includes at least one of an abnormality in the angle detection unit and an abnormality related to the receiving of the instruction by the communication unit.

3. The drive control device of claim 1, wherein the configuration unit is configured to set the own drive instruction system to the slave mode, before the detection of an abnormality, including the calculation abnormality and drive control abnormality, continues for a certain period of time or longer, when the abnormality is detected, and wherein the abnormality is confirmed when the detection of the abnormality continues for the certain period of time or longer, and the drive unit of the own drive instruction system is stopped.

4. The drive control device of claim 1, wherein each of the plurality of drive instruction systems further includes a calculation abnormality obtaining unit that obtains calculation abnormality information, the calculation abnormality information indicates that the calculation abnormality has been detected in at least one of the plurality of drive instruction systems other than the own drive instruction system, and wherein, when the calculation abnormality information is obtained by the calculation abnormality obtaining unit, the configuration unit sets the own drive instruction system to the master mode.

5. The drive control device of claim 1, wherein each of the plurality of drive instruction systems further includes:

a drive control abnormality obtaining unit that obtains drive control abnormality information, the drive control abnormality information indicates that a drive control abnormality has been detected in at least one of the plurality of drive instruction systems other than the own drive instruction system; and a reduction unit reducing the drive torque calculated by the calculation unit, wherein the master mode includes a reduction mode, wherein, when the drive control abnormality information is obtained by the drive control abnormality obtaining unit, the configuration unit sets the own drive instruction system to the reduction mode, wherein, in the reduction mode, the reduction unit prohibits the distribution process by the distribution unit and reduces the drive torque to a third torque, and wherein the drive control unit controls the drive unit with the third torque in the reduction mode.

6. The drive control device of claim 1, wherein each of the plurality of drive instruction systems further includes:

a rotation angle detection unit configured to detect a rotation angle of the drive unit; and an abnormality detection unit configured to detect, based on the rotation angle detected by the rotation angle detection unit and the angle detected by the angle detection unit, occurrence of at least one of an abnormality in the rotation angle detection unit or an abnormality in the angle detection unit.

7. The drive control device of claim 6, wherein the rotation angle detection unit is concentric with an output shaft of the drive unit, wherein the drive unit includes a plurality of motor windings corresponding to the drive control units in the plurality of drive instruction systems, wherein the plurality of motor windings are offset from each other by a predetermined angle, and wherein each of the drive control units controls the drive unit by generating a control signal corresponding to the offset of the predetermined angle.

8. The drive control device of claim 6, wherein, when the abnormality is detected by the abnormality detection unit, the configuration unit switches the mode before the abnormality is confirmed.

9. The drive control device of claim 1, wherein the drive unit includes a coil unit, and wherein each of the plurality of drive instruction systems includes a disconnection unit that, when the own drive instruction system is set to the termination mode, stops supplying power to the drive unit and disconnects a wiring connection to which an end of the coil unit is wired.

10. The drive control device of claim 1, wherein the communication unit receives a mode command from the higher-level device according to a mode of the higher-level device, and wherein the configuration unit sets a mode indicated by the mode command to the own drive instruction system.

11. A drive control method of a drive control device that includes a plurality of drive instruction systems, each of the plurality of drive instruction systems including:

a communication unit receiving an instruction about a position of a pitman arm from a higher-level device;

an angle detection unit detecting an angle of the pitman arm;

a calculation unit calculating a drive torque for the pitman arm based on the instruction and the angle of the pitman arm;

a distribution unit distributing the drive torque according to a predetermined ratio; and a drive control unit controlling a drive unit, wherein the drive control method includes performing, by one of the plurality of drive instruction systems, a torque distribution process including a calculation process by the calculation unit and a distribution process by the distribution unit, and synchronously controlling, by the drive control unit in each of the plurality of drive instruction systems, the drive unit with a torque distributed by the torque distribution process, wherein each of the plurality of drive instruction systems further includes a configuration unit that sets the drive instruction system to a master mode or a slave mode, the drive instruction system performs the torque distribution process in the master mode, and the drive instruction system does not perform the torque distribution process in the slave mode, a calculation abnormality detection unit detects a calculation abnormality indicating that the torque distribution process is unable to be performed, and a drive control abnormality detection unit that detects a drive control abnormality indicating occurrence of an abnormality in the drive control unit, wherein the drive control method further includes setting, by the configuration unit, own drive instruction system to the slave mode, when the calculation abnormality is detected by the calculation abnormality detection unit, and setting, by the configuration unit, the own drive instruction system to a termination mode to terminate operation of the own drive instruction system, when the drive control abnormality is detected by the drive control abnormality detection unit.

12. A computer-readable non-transitory storage medium storing a program causing a computer to function as a drive control device, the drive control device including a plurality of drive instruction systems, each of the plurality of drive instruction systems including:

a communication unit receiving an instruction about a position of a pitman arm from a higher-level device;

an angle detection unit detecting an angle of the pitman arm;

a calculation unit calculating a drive torque for the pitman arm based on the instruction and the angle of the pitman arm;

a distribution unit distributing the drive torque according to a predetermined ratio; and a drive control unit controlling a drive unit, wherein the program causes one of the plurality of drive instruction systems to perform a torque distribution process including a calculation process by the calculation unit and a distribution process by the distribution unit, and wherein the program causes the drive control unit in each of the plurality of drive instruction systems to synchronously control the drive unit with a torque distributed by the torque distribution process, wherein each of the plurality of drive instruction systems further includes a configuration unit that sets the drive instruction system to a master mode or a slave mode, the drive instruction system performs the torque distribution process in the master mode, and the drive instruction system does not perform the torque distribution process in the slave mode, a calculation abnormality detection unit detects a calculation abnormality indicating that the torque distribution process is unable to be performed, and a drive control abnormality detection unit that detects a drive control abnormality indicating occurrence of an abnormality in the drive control unit, wherein the program causes the configuration unit in each of the plurality of drive instruction systems to set own drive instruction system to the slave mode, when the calculation abnormality is detected by the calculation abnormality detection unit, and set the own drive instruction system to a termination mode to terminate operation of the own drive instruction system, when the drive control abnormality is detected by the drive control abnormality detection unit.

* * * * *